United States Patent
Saita

(10) Patent No.: US 12,291,120 B2
(45) Date of Patent: May 6, 2025

(54) CHARGING CONTROL METHOD FOR ELECTRIC MOVING BODY, AND ELECTRIC MOVING BODY

(71) Applicant: HONDA MOTOR CO., LTD., Tokyo (JP)

(72) Inventor: Akira Saita, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 594 days.

(21) Appl. No.: 17/677,897

(22) Filed: Feb. 22, 2022

(65) Prior Publication Data

US 2022/0305937 A1   Sep. 29, 2022

(30) Foreign Application Priority Data

Mar. 26, 2021   (JP) .................. 2021-053656

(51) Int. Cl.
*B60L 53/62* (2019.01)
*B60L 53/66* (2019.01)

(52) U.S. Cl.
CPC ............... *B60L 53/62* (2019.02); *B60L 53/66* (2019.02)

(58) Field of Classification Search
CPC ................................ B60L 53/62; B60L 53/66
USPC ........................................................ 320/137
See application file for complete search history.

(56) References Cited

U.S. PATENT DOCUMENTS

| | | | |
|---|---|---|---|
| 9,995,591 B2 | 6/2018 | Shimizu et al. | |
| 2011/0270476 A1* | 11/2011 | Doppler | B60L 15/2045 320/109 |
| 2012/0256588 A1 | 10/2012 | Hayashi et al. | |
| 2014/0217976 A1* | 8/2014 | McGrath | B60L 15/2045 320/109 |
| 2016/0052413 A1* | 2/2016 | Shimizu | H04W 4/027 700/291 |
| 2019/0146425 A1* | 5/2019 | Lee | G06Q 30/0283 700/291 |
| 2019/0389315 A1* | 12/2019 | Zhu | B60L 53/64 |
| 2020/0274363 A1* | 8/2020 | Kudo | H02J 13/00002 |
| 2021/0138928 A1* | 5/2021 | O'Gorman | B60L 50/50 |
| 2021/0203177 A1* | 7/2021 | Peng | B60L 53/63 |
| 2022/0048399 A1* | 2/2022 | Nishita | H02J 3/003 |

(Continued)

FOREIGN PATENT DOCUMENTS

| | | |
|---|---|---|
| JP | 2011-188731 A | 9/2011 |
| JP | 2012-228165 A | 11/2012 |

(Continued)

OTHER PUBLICATIONS

Office Action dated Jan. 10, 2023 issued over the corresponding Japanese Patent Application No. 2021-053656 with the English translation thereof.

*Primary Examiner* — Jack Chiang
*Assistant Examiner* — Suchin Parihar
(74) *Attorney, Agent, or Firm* — Carrier, Shende & Associates P.C.; Joseph P. Carrier; Jeffrey T. Gedeon

(57) ABSTRACT

Scheduled usage of an electric moving body that moves using a battery as a power source is acquired; a necessary remaining capacity that is a charging state necessary for the scheduled usage is acquired; and if the necessary remaining capacity is not reached by a start timing of the scheduled usage, a charging plan set in advance prior to the acquired scheduled usage is changed in a manner that the necessary remaining capacity is reached by the start timing of the scheduled usage.

10 Claims, 12 Drawing Sheets

(56) References Cited

U.S. PATENT DOCUMENTS

| | | | |
|---|---|---|---|
| 2022/0188946 A1* | 6/2022 | Moura | G06Q 30/0283 |
| 2022/0234459 A1* | 7/2022 | Auberger | B60L 53/66 |
| 2022/0250497 A1* | 8/2022 | Zhang | B60L 58/13 |
| 2022/0258638 A1* | 8/2022 | Harirchi | G06Q 30/0202 |
| 2022/0297565 A1* | 9/2022 | Saita | B60L 53/68 |
| 2022/0305942 A1* | 9/2022 | Mannepalli | B60L 53/68 |

FOREIGN PATENT DOCUMENTS

| | | |
|---|---|---|
| JP | 2016-059248 A | 4/2016 |
| JP | 2017-162473 A | 9/2017 |
| WO | 2014/002205 A1 | 1/2014 |

* cited by examiner

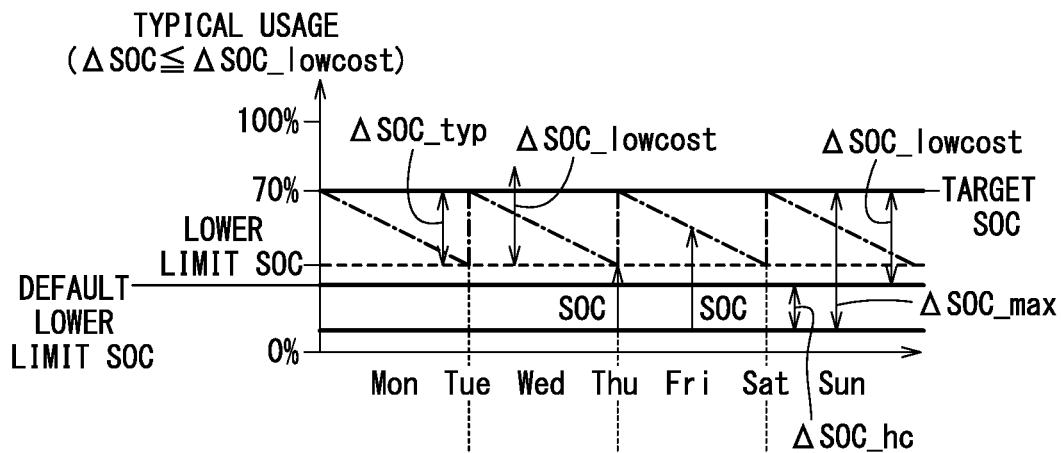
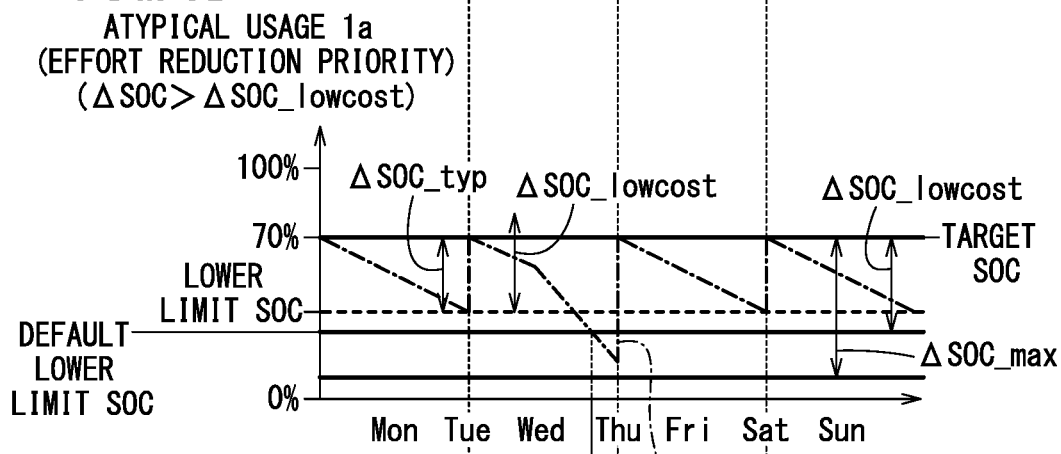
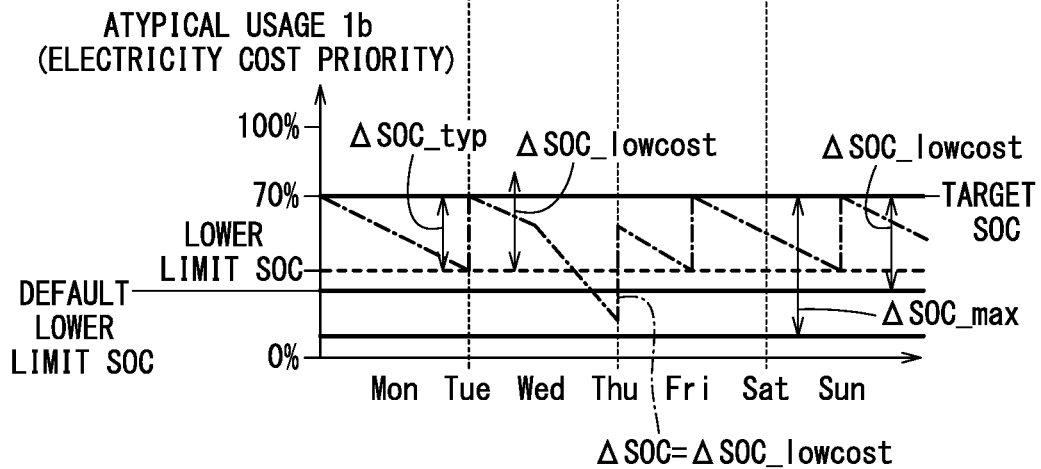

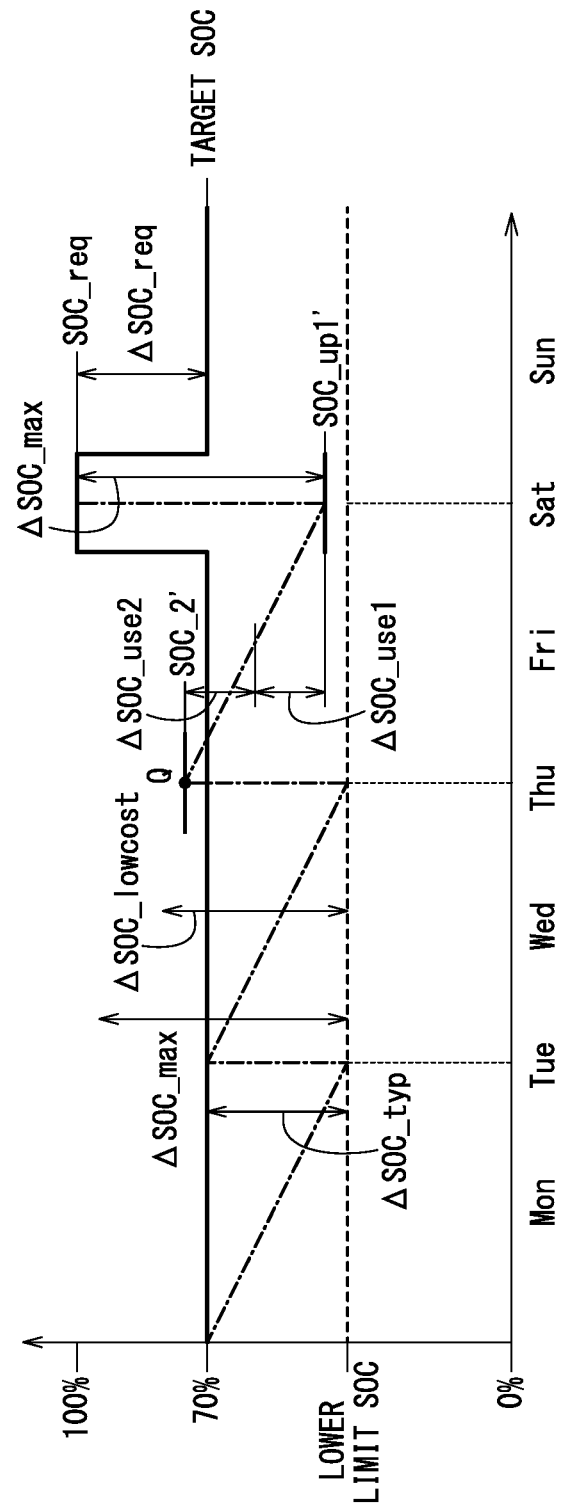

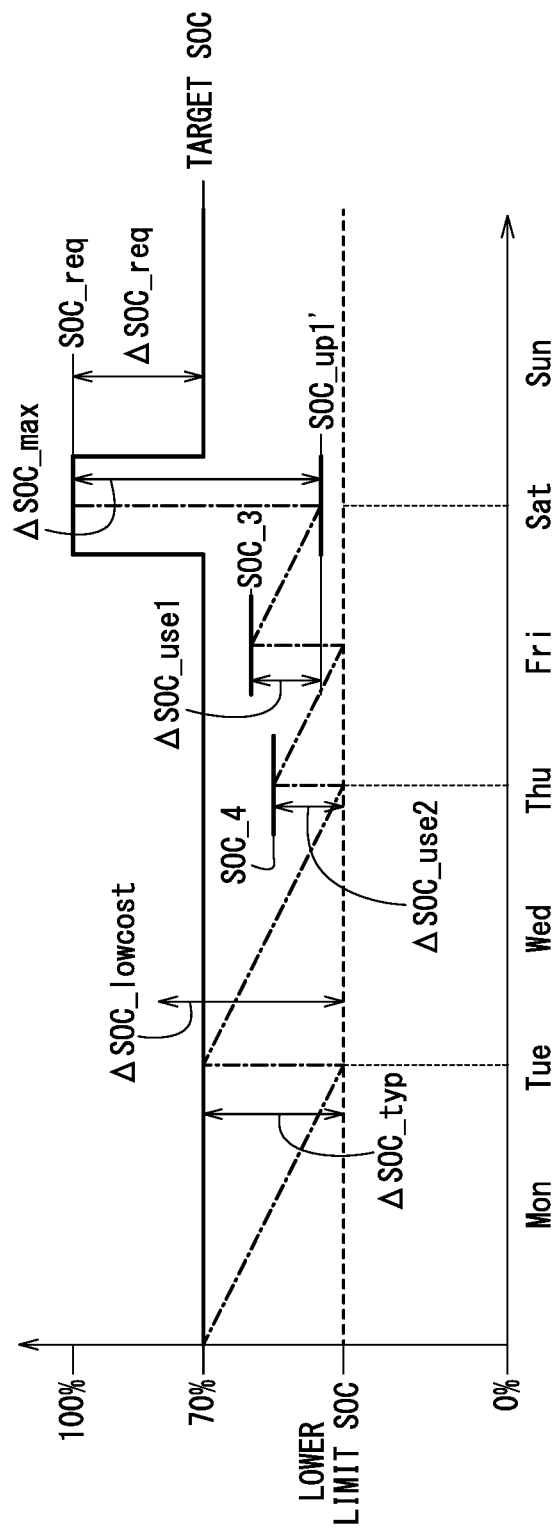
FIG. 8   2c: DETERIORATION SUPPRESSION PRIORITY

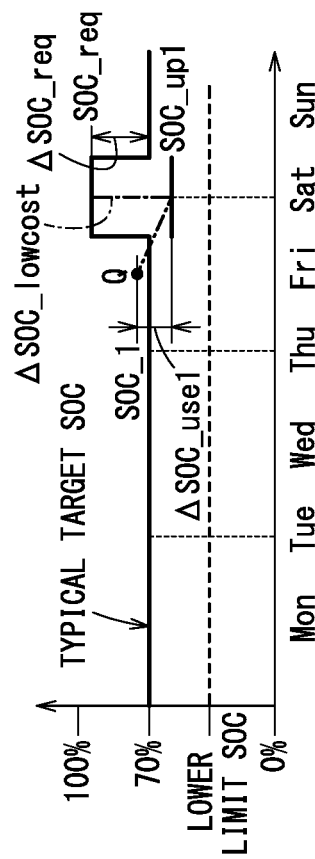
FIG. 9A  SOC_up1 CALCULATION
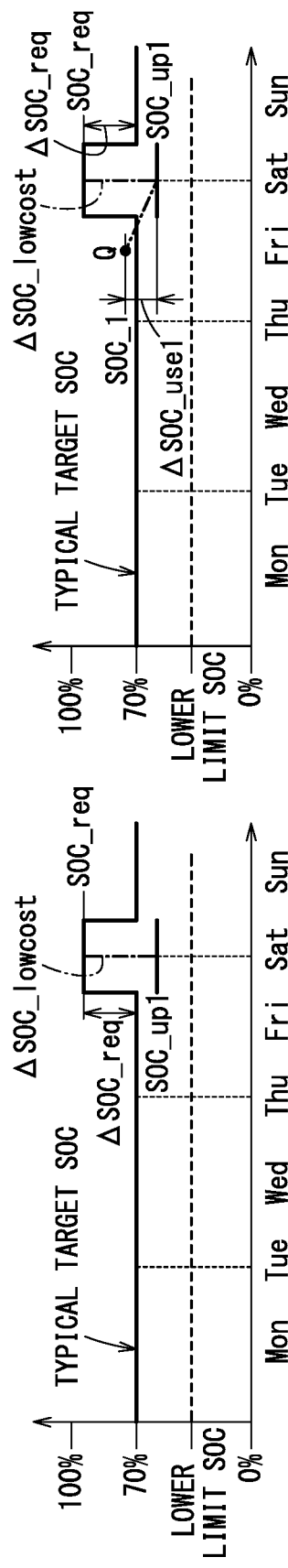
FIG. 9B  SOC_1 (=Q) CALCULATION
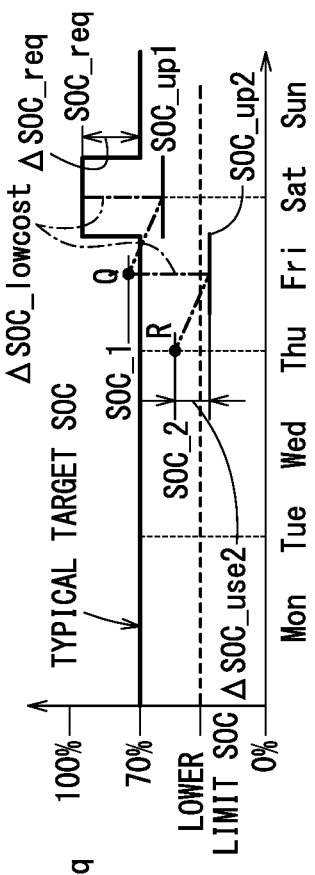
FIG. 9C  SOC_up2 CALCULATION
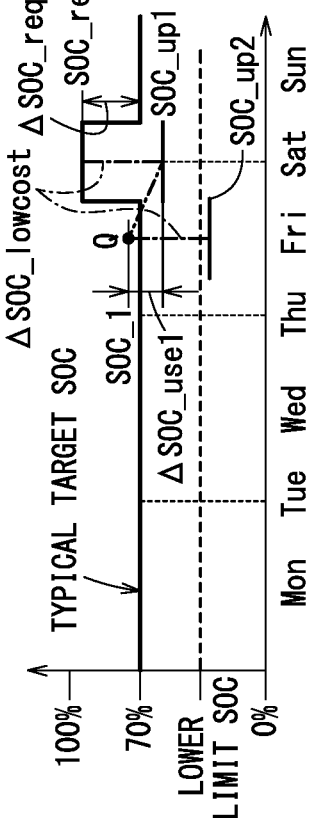
FIG. 9D  SOC_2 (=R) CALCULATION

FIG. 10

SECOND CONTROL MODE
S17(S12:NO)

START
↓
S17a: IS THERE INTENT TO PRIORITIZE NUMBER OF CHARGES OVER ELECTRICITY COST?

YES (EFFORT REDUCTION PRIORITY) →
S17c: RECALCULATE PLAN ENABLING CHARGING WITHIN ΔSOC_max[%/INSTANCE] ON PLURALITY OF SCHEDULED CHARGING DAYS BEFORE SPECIFIED DAY NO (ELECTRICITY COST PRIORITY) →
S17b: RECALCULATE PLAN ENABLING CHARGING WITHIN ΔSOC_lowcost[%/INSTANCE] ON PLURALITY OF SCHEDULED CHARGING DAYS BEFORE SPECIFIED DAY ↓
S17d: IS IT POSSIBLE TO CHARGE NECESSARY AMOUNT BY CHARGING ON ONLY SCHEDULED CHARGING DAYS?

YES → RETURN

NO →
S17e: INCREASE NUMBER OF SCHEDULED CHARGING DAYS
↑ (loops back)

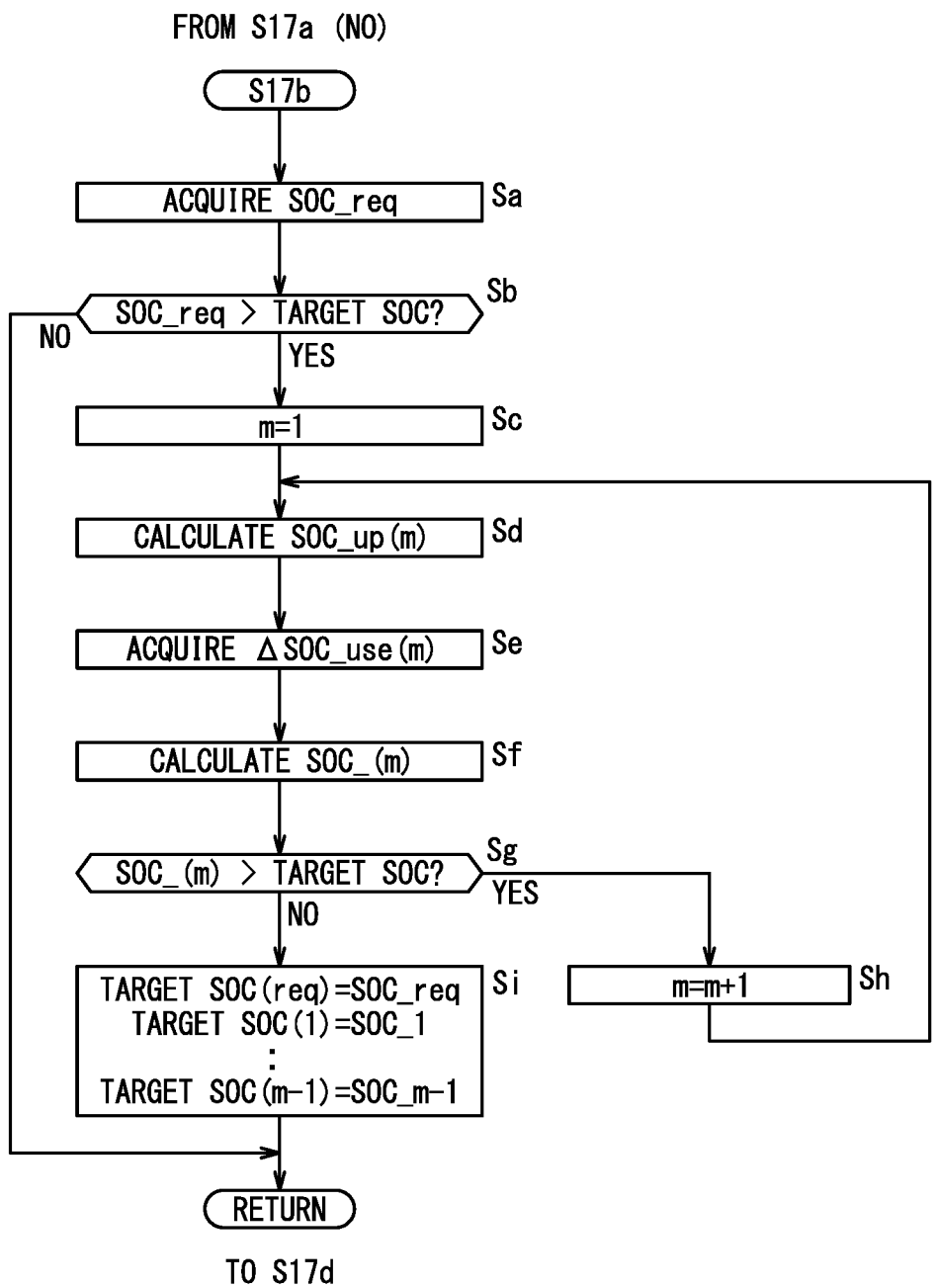

CHARGING CONTROL METHOD FOR
ELECTRIC MOVING BODY, AND ELECTRIC
MOVING BODY

CROSS-REFERENCE TO RELATED APPLICATIONS

This application is based upon and claims the benefit of priority from Japanese Patent Application No. 2021-053656 filed on Mar. 26, 2021, the contents of which are incorporated herein by reference.

BACKGROUND OF THE INVENTION

Field of the Invention

The present invention relates to a charging control method for an electric moving body, such as a vehicle, ship, boat, airplane, or unmanned flying body, which moves using a battery loaded therein as a power source, and also to an electric moving body.

Description of the Related Art

As an example, JP 2012-228165 A discloses an electric automobile charging control system that predicts a power usage amount of a battery of an electric automobile on the following day. With this electric automobile charging control system, if the remaining capacity of the battery upon returning home does not reach the power usage amount needed for travel on the following day, the battery is charged up to the power usage amount (Abstract of JP 2012-228165 A).

Furthermore, JP 2016-059248 A discloses a vehicle that, even when timer charging (reservation charging) is set by a user, revokes the timer charging and selects an immediate charging mode under prescribed conditions (Abstract of JP 2016-059248 A). For example, the timer charging is revoked when the charging plug connected to the charging port of the vehicle is inserted and removed a prescribed number of times or more.

SUMMARY OF THE INVENTION

There are cases where, depending on the day, a user of an electric moving body wants to use the electric moving body for an irregular (atypical or unusual) scheduled usage that differs from the typical (usual) scheduled usage.

However, with the conventional art described above, a charging control method for an electric moving body that takes into account an irregular (atypical or unusual) scheduled usage is not envisioned, and this negatively impacts the convenience of the electric moving body.

The present invention has been devised taking into consideration the aforementioned problem, and has the object of providing an electric moving body and a charging control method for the electric moving body making it possible to preserve (charge) the battery up to a necessary remaining capacity by the scheduled usage start timing of the electric moving body, even when there is irregular (atypical or unusual) scheduled usage that differs from the typical (usual) scheduled usage.

A charging control method for an electric moving body according to one aspect of the present invention is a charging control method for an electric moving body that moves using a battery as a power source, the charging control method comprising: acquiring scheduled usage of the electric moving body; acquiring a necessary remaining capacity that is a charging state necessary for the scheduled usage; and if the necessary remaining capacity is not reached by a start timing of the scheduled usage, changing a charging plan set in advance prior to the acquired scheduled usage, the charging plan being changed in a manner that the necessary remaining capacity is reached by the start timing of the scheduled usage.

A charging control method for an electric moving body according to another aspect of the present invention is a charging control method for an electric moving body that moves using a battery as a power source, the charging control method comprising: if there are a prescribed number of days on which charging and discharging are performed a plurality of times from when a scheduled usage of the electric moving body is acquired to a scheduled usage start timing, causing a user to select whether a necessary remaining capacity that is necessary at the scheduled usage start timing is to be charged immediately before the scheduled usage start timing in an electricity cost priority mode in which the battery is charged by charging with a low-cost charging amount that is a maximum charging amount achieved by charging only in a time period during which an electricity cost is low, or in an effort reduction priority mode in which the battery is charged with a predetermined charging amount including a charging amount in a time period during which the electricity cost is not low; and changing a charging plan existing before a charging process is performed immediately before the scheduled usage start timing, in a manner that a remaining capacity immediately before the scheduled usage start timing in the selected charging mode becomes a remaining capacity obtained by subtracting the low-cost charging amount from the necessary remaining capacity or a remaining capacity obtained by subtracting the predetermined charging amount from the necessary remaining capacity.

An electric moving body according to yet another aspect of the present invention is an electric moving body that moves using a battery as a power source and comprises a charging control apparatus including a memory that stores instructions, and a CPU that reads and executes the instructions from the memory, wherein the CPU executes the instructions to cause the charging control apparatus to: acquire scheduled usage of the electric moving body; acquire a necessary remaining capacity that is a charging state necessary for the scheduled usage; and if the necessary remaining capacity is not reached by a start timing of the scheduled usage, change a charging plan set in advance prior to the acquired scheduled usage, the charging plan being changed in a manner that the necessary remaining capacity is reached by the start timing of the scheduled usage.

According to the present invention, by performing charging control to change the charging plan in accordance with the scheduled usage start timing of the electric moving body so that the necessary remaining capacity is reached, and also charging the battery in a manner that the remaining capacity thereof is less than or equal to the necessary charging amount in the charging control, the time during which the battery is in a state near a full charge is reduced.

As a result, the necessary remaining capacity, which is the remaining capacity needed by the scheduled usage start timing of the electric moving body, can be preserved in the battery, and therefore both convenience and deterioration suppression can be achieved.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5A is a time chart of an SOC transition prediction for typical usage within a target SOC, FIG. 5B is a time chart of effort reduction priority control for atypical usage, and FIG. 5C is a time chart of electricity cost priority control for atypical usage;

FIG. 7 is a time chart of the effort reduction priority control in a case where the target remaining capacity is increased;

FIG. 8 is a time chart of deterioration suppression priority control in a case where the target remaining capacity is increased;

FIG. 9A is a time chart provided to describe back-calculating procedure 1, FIG. 9B is a time chart provided to describe back-calculating procedure 2, FIG. 9C is a time chart provided to describe back-calculating procedure 3, and FIG. 9D is a time chart provided to describe back-calculating procedure 4;

FIG. 10 is a flow chart provided to describe an operation in a case where the target remaining capacity is increased;

FIG. 11 is a flow chart showing a general control procedure for setting the target SOC for electricity cost priority.

DESCRIPTION OF THE INVENTION

Figure 1:
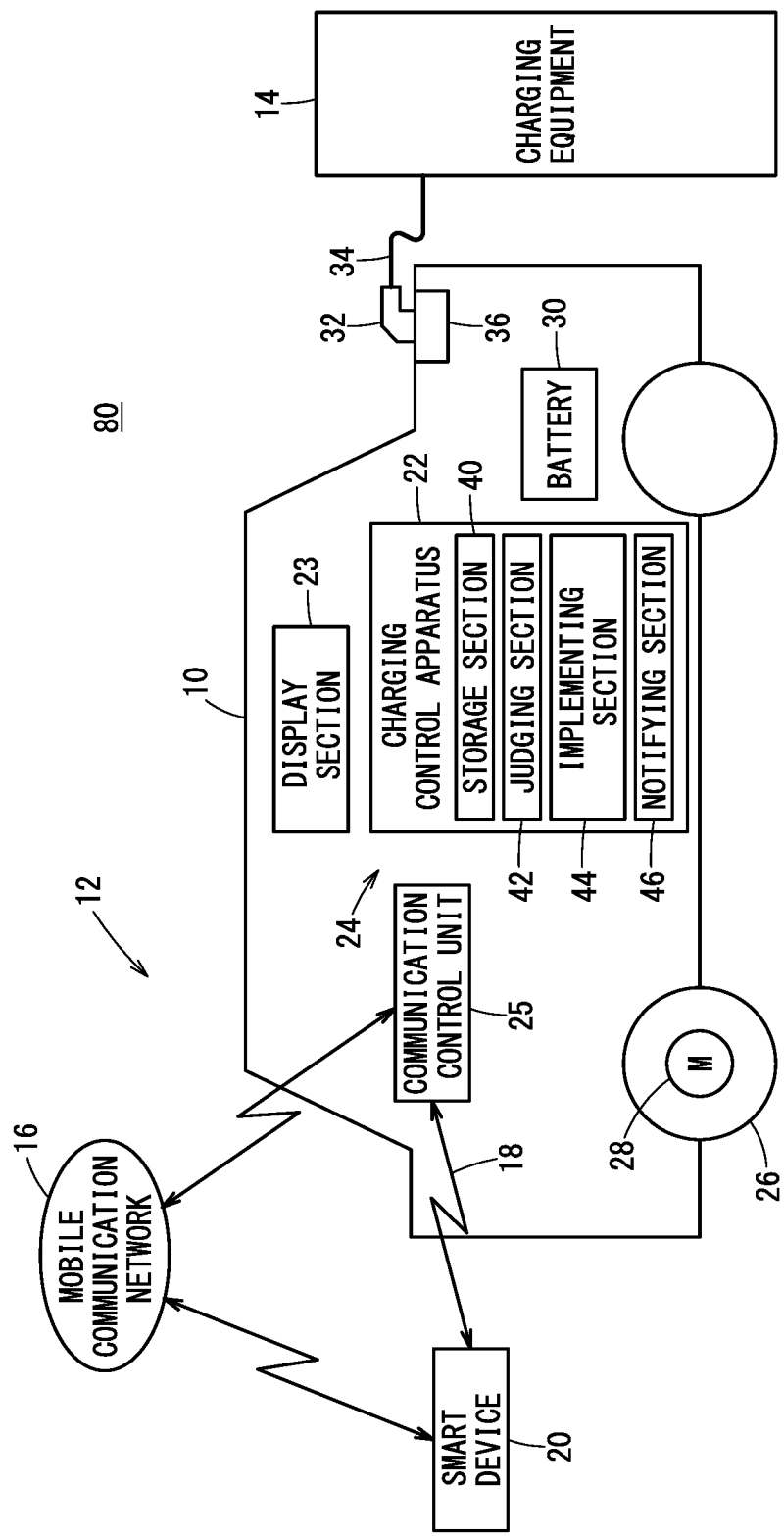
FIG. 1 is a system diagram showing a configurational example of a system including an electric vehicle serving as an electric moving body according to an embodiment implementing a charging control method for an electric moving body according to the embodiment.

Preferred embodiments of a charging method for an electric moving body and an electric moving body according to the present invention will be presented and described in detail below with reference to the accompanying drawings.
[Configuration]
FIG. 1 is a system diagram showing a configurational example of a system 12 including an electric vehicle (here, an electric automobile) 10 serving as the electric moving body according to an embodiment implementing the charging control method for an electric moving body according to the present embodiment.

The system 12 is formed by, in addition to the electric vehicle 10, charging equipment 14 that supplies power to the electric vehicle 10 from the outside, and a smart device 20. The smart device 20 is a smartphone or the like capable of communicating with the electric vehicle 10 via a mobile communication network 16 or short-range wireless communication 18 such as Bluetooth (Registered Trademark). The mobile communication network 16 may include the Internet.

The smart device 20 is a terminal carried by a user, who is a driver or the like of the electric vehicle 10.

The electric vehicle 10 includes a navigation apparatus 24, in which a charging control apparatus 22 is mounted, and a battery 30 that supplies power to an electric motor 28 that rotationally drives wheels 26 of the electric vehicle 10.

The battery 30 is a high-capacity lithium-ion battery. The electric vehicle 10 can ensure a cruising distance of approximately 500 [km] with a single charge. The present invention is also capable of being applied to a moving body such as an electric vehicle that has a cruising distance shorter or longer than 500 [km].

In this electric vehicle 10, the charging control apparatus 22 is mounted in the navigation apparatus 24. All constituent elements of the charging control apparatus 22, or constituent elements other than an implementing section 44, can be provided independently of the navigation apparatus 24, for example, in a management server 82 (FIG. 12) as described further below.

Returning to FIG. 1, the navigation apparatus 24 includes the charging control apparatus 22, a display section (on-board display) 23, and a communication control unit 25.

Figure 2:
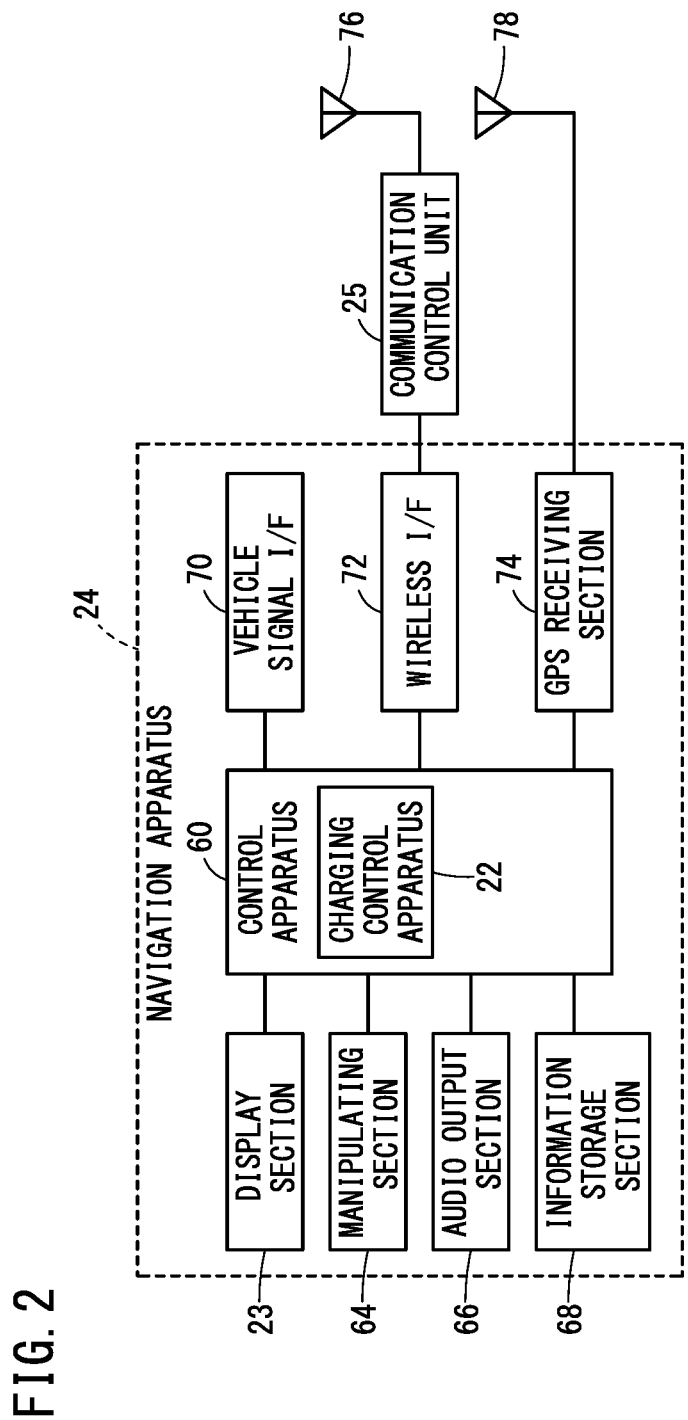
FIG. 2 is a block diagram showing a detailed configurational example of a navigation apparatus.

FIG. 2 is a block diagram showing a detailed configurational example of the navigation apparatus 24.

As shown in FIG. 2, the navigation apparatus 24 includes a control apparatus 60 in which the charging control apparatus 22 is mounted. The navigation apparatus 24 includes the display section (display) 23, a manipulating section 64, an audio output section (speaker) 66, an information storage section 68, a vehicle signal I/F 70, a wireless I/F 72, and a GPS receiving section (satellite positioning apparatus) 74, which transmit and receive various signals including a control signal to and from the control apparatus 60.

The display section 23 displays a map, a current location, and a recommended route from the current location to a destination, based on data from the control apparatus 60. The manipulating section 64 is manipulated by the user when the user issues various instructions to the navigation apparatus 24. Note that a touch panel display in which the display section 23 and the manipulating section 64 are combined may be used. The audio output section 66 outputs audio relating to route guidance, notification of various types of information, and the like. The information storage section 68 stores data such as map data. The vehicle signal I/F 70 provides signal transmission and reception between the control apparatus 60 and sensors (not shown in the drawings), such as a vehicle velocity sensor, which detect information relating to the current geographical position and the like.

The wireless I/F 72 provides signal transmission and reception between the control apparatus 60 and the communication control unit 25. The communication control unit 25 transmits and receives radio waves via an antenna 76 to communicate with the smart device 20 via the mobile communication network 16 or the short-range wireless communication 18. The GPS receiving section 74 captures GPS radio waves from a positioning satellite with an antenna 78, and identifies the position of the current location based on these GPS radio waves.

The smart device 20 is carried by the user and is capable of communication through wireless communication via the mobile communication network 16 or the short-range wireless communication 18, both inside and outside of the electric vehicle 10.

The navigation apparatus 24 is capable of communicating with the management server 82 described further below, a server of an electricity supplier (not shown in the drawings), and the like, via the mobile communication network 16, the Internet (not shown in the drawings), and a public communication network (not shown in the drawings). The management server 82 is capable of communicating with the electricity supplier through the public communication network and the Internet.

Returning to FIG. 1, the charging equipment 14, which is connected to a grid power supply (not shown in the drawings) of the electricity supplier, is installed at a parking space (prescribed parking location) at home or a workplace of the user of the electric vehicle 10, a charging stand along a public road, or the like. The charging equipment 14 includes a charging cord 34 that has a charging plug 32 provided at the tip thereof.

After the user has finished one day of using the electric vehicle 10 and returned to the prescribed parking space, if it is judged that the remaining capacity of the battery 30 is low, the user opens a charging lid (not shown in the drawings) on the hood of the electric vehicle 10 when performing charging overnight, for example. Then, the user holds the charging plug 32 at one end of the charging cord 34, which is connected to the charging equipment 14 at the other end, removes this charging plug 32 from the home location (storage location) on the charging equipment 14, and attaches the charging plug 32 to a charging port (connector) 36 of the electric vehicle 10. As a result, the charging equipment 14 and the charging port 36 are electrically connected in a state enabling charging, via the charging cord 34.

In this case, under the control of the charging control apparatus 22, the battery 30 is charged from the charging equipment 14 during a late-night time period during which the electricity cost (power cost) is usually lower than during the day. If this charging is insufficient, the battery 30 is charged from the charging equipment 14 during the day time when the electricity cost is relatively high.

Just because the electric vehicle 10 is connected to the charging equipment 14 via the charging cord 34 does not mean that the battery 30 is being charged.

The charging plan for charging or not charging the battery 30 is determined by a judging section 42 of the charging control apparatus 22, and there may be cases where the charging control apparatus 22 stops or suspends the charging of the battery 30 even when the electric vehicle 10 is being connected to the charging equipment 14.

When departing on the following day after the charging has finished, the user removes the charging plug 32 from the charging port 36 and closes the charging lid (not shown in the drawings). After this, the user attaches the charging plug 32 at the home position on the charging equipment 14.

The charging control apparatus 22 is formed by a microcomputer that functions as the various functional sections by having a CPU execute a program stored in a memory. The charging control apparatus 22 includes, in addition to a storage section 40 that is the memory, the judging section 42 serving as a computing section, the implementing section 44, and a notifying section 46.

The charging control apparatus 22 controls charging of the battery 30 (charging implemented based on the charging plan) when the charging plug 32 of the charging equipment 14 is connected to the charging port 36 of the electric vehicle 10.

Under prescribed conditions, the notifying section 46 provides notification, such as prompting the charging of the battery 30 (charging request), to the smart device 20 of the user through the communication control unit 25. The notification such as prompting the charging of the battery 30 is also provided to the on-board display section 23.

If the smart device 20 is located within the effective communication area of the short-range wireless communication 18, the notification prompting charging or the like is provided to the smart device 20 through the short-range wireless communication 18, and if the smart device 20 is located outside of the effective communication area of the short-range wireless communication 18, the notification is provided through the mobile communication network 16.

Upon receiving instructions requesting charging of the battery 30 from the judging section 42, the implementing section 44 of the electric vehicle 10 charges the battery 30 up to the remaining capacity (target state of charge (SOC)) indicated by the instructions from the judging section 42.

[Operation]

Figure 3:
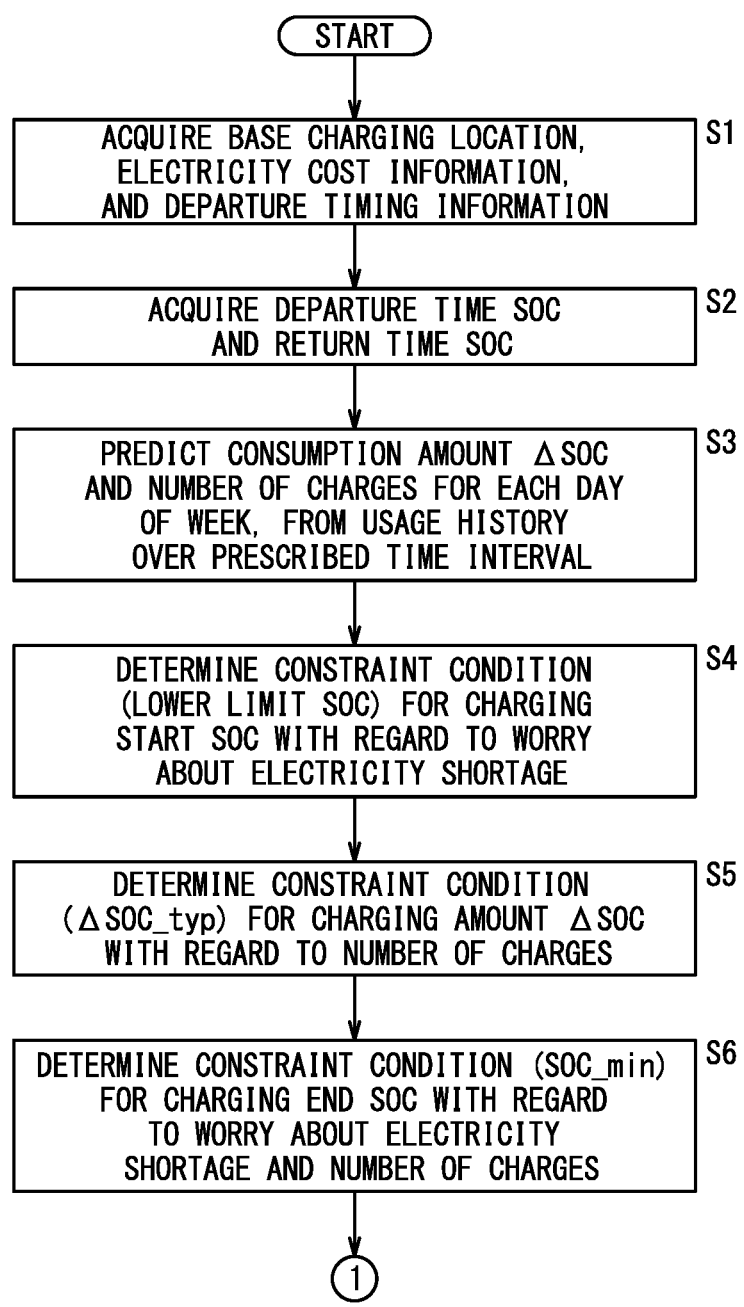
FIG. 3 is a flow chart (1/2) provided to describe the operation of the embodiment.
Figure 4:
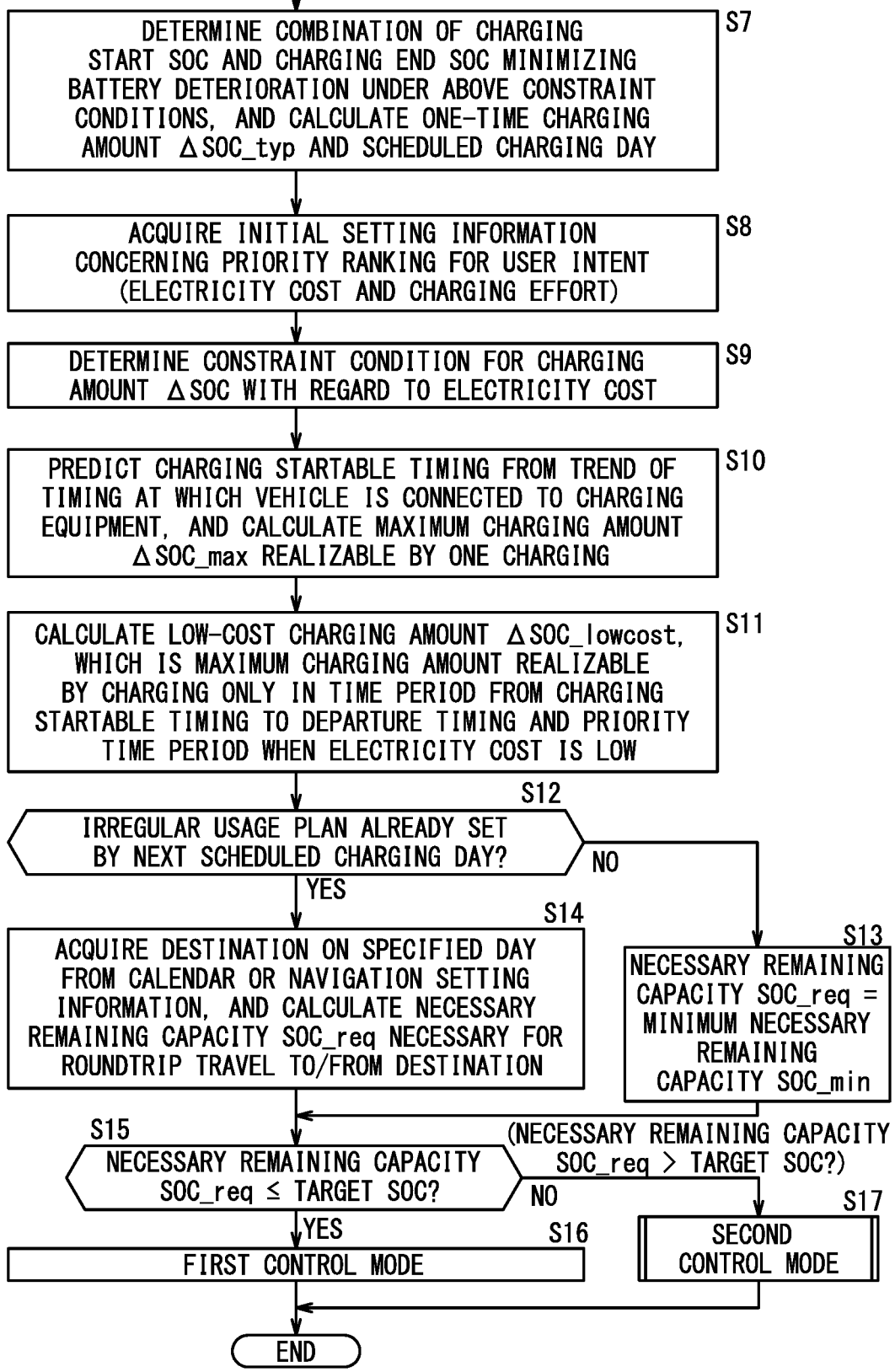
FIG. 4 is a flow chart (2/2) provided to describe the operation of the embodiment.

The following describes the operation performed by the (CPU of the) charging control apparatus 22 of the system 12 configured basically as described above, while referencing the flow chart (1/2) of FIG. 3 and the flow chart (2/2) of FIG. 4.

The subject executing the program according to these flow charts is the charging control apparatus 22 (any one of the judging section 42, the implementing section 44, and the notifying section 46, excluding the storage section 40).

In the present embodiment, the charging control apparatus 22 storing the program is mounted in the electric vehicle 10, but as described above, the program is provided in the management server 82 (FIG. 10) in the modification described further below.

At step S1, a base charging location (prescribed charging location) of the electric vehicle 10 is specified. Here, a house (home) 80 having the charging equipment 14 is specified as the base charging location through the manipulating section 64, under the control of the implementing section 44. More specifically, a measured position of the electric vehicle 10 detected by the GPS receiving section 74 in a state where the charging plug 32 is electrically connected to the charging port 36 of the charging equipment 14 after the electric vehicle 10 has returned home is specified as the base charging location, and recorded in advance in the storage section 40.

Furthermore, at step S1, the implementing section 44 automatically acquires electricity cost information for the house 80 having the charging equipment 14, through the navigation apparatus 24 via the Internet (not shown in the drawings), from the electricity supplier (not shown in the drawings) who the home 80 (user) has a contract with.

Alternatively, the user may manually input the electricity cost information according to their contract, by manipulating the smart device 20 or manipulating the manipulating section 64 of the navigation apparatus 24.

Furthermore, at step S1, the implementing section 44 acquires departure timing information for past departures of the electric vehicle 10, through the navigation apparatus 24.

At step S2, the remaining capacity of the battery 30, which is the SOC (or remaining capacity SOC) [%] in the present embodiment, at the time of departure of the electric vehicle 10 from the home 80 is recorded in the storage section 40. The SOC at the time of departure is referred to as a departure time SOC.

The remaining capacity is not limited to being the SOC [%], and may instead be recorded and/or managed as a power amount [Wh] or ampere hours [Ah]. The same is true below.

Also at step S2, the remaining capacity SOC of the battery 30 at the time when the electric vehicle 10 has returned to the home 80 (arrived at home) is recorded in the storage section 40 as a return time SOC.

The judging section (charging plan judging section) 42 calculates a one-day consumption amount ΔSOC of the SOC, using the acquired departure time SOC and return time SOC (ΔSOC=departure time SOC−return time SOC).

The judging section (charging plan judging section) 42 stores the calculated consumption amount ΔSOC in the storage section (vehicle history holding section) 40 as the usage history of the battery 30 (travel history of the electric vehicle 10). Accordingly, at step S2, the consumption amount of one day (daily consumption amount) ΔSOC over a certain time interval in the past is stored in the storage section (vehicle history holding section) 40.

The following description also references the SOC transition prediction diagram for typical usage shown in FIG. 5A.

At step S3, the daily consumption amount ΔSOC consumed by the average usage of the electric vehicle 10 on each day of the week during typical usage (FIG. 5A) over one week (seven days) starting on the following day is predicted, from the trend in the usage history of the past certain time interval, which is one month (30 days), for example. Furthermore, the number of charges (charging frequency) Nu per week that can be tolerated by the user is predicted from the trend in the usage history over the past one month (30 days). From the SOC transition prediction in FIG. 5A, it is understood that the electric vehicle 10 is charged with an amount of power consumed by two days worth of travel, by a one-time typical charging amount ΔSOC_typ (typical charging amount ΔSOC_typ=2×daily consumption amount ΔSOC).

The return time SOC n days later (in this example, 1, 2, 3, 4, 5, 6, and 7 days later) is predicted from this SOC transition prediction. Details of this are described in steps S4 to S7.

Next, at step S4, a lower limit SOC at which the user feels worried about an electricity shortage is determined. A constraint condition for a charging start SOC relating to the worry about an electricity shortage felt by the user is determined according to the lower limit SOC.

The lower limit SOC can be set as a default by the implementing section 44 or set by the user using an on-board human machine interface (HMI) described further below. Alternatively, the charging control apparatus 22 (system) may calculate the consumption amount ΔSOC consumed by one day of vehicle usage from the usage history of the electric vehicle 10, and determine the lower limit SOC to be a threshold value corresponding to differences among the usage tendencies of each individual user. The lower limit SOC determined in this way can also be set to be variable.

Next, at step S5, a constraint condition of the charging amount (increase amount from a certain remaining capacity to a higher remaining capacity) ΔSOC relating to the number of charges is determined based on the usage history over the prescribed time interval, e.g. one month.

The judging section (charging plan judging section) 42 divides a necessary charging amount ΔSOC_drv for one week, which is calculated by adding up the average consumption amounts ΔSOC classified according to days of the week over a certain time interval (e.g. one week), by the number of charges per week (charging frequency) Nu that can be tolerated by the user. In this way, the one-time typical charging amount ΔSOC_typ needed to cover the average consumption amount for several days of travel is calculated.

Furthermore, at step S6, the judging section (charging plan judging section) 42 determines a minimum necessary remaining capacity SOC_min as a constraint condition relating to a charging end SOC. The minimum necessary remaining capacity SOC_min is a constraint condition for the charging end SOC for preventing a drop in convenience for the user caused by worry about an electricity shortage and an increase in charging frequency. The minimum necessary remaining capacity SOC_min is calculated by adding the one-time typical charging amount ΔSOC_typ to the lower limit SOC (minimum value for a minimum SOC, described further below) (SOC_min=lower limit SOC+ΔSOC_typ).

At step S7, a combination of a charging start SOC and a charging end SOC that minimizes deterioration of the battery 30 is determined, under the constraint conditions of steps S4 to S6 described above. In this way, the lower limit SOC, the minimum SOC (minimum SOC≥lower limit SOC) described further below, a target SOC (target remaining capacity, which is the minimum necessary remaining capacity SOC_min in the present embodiment, as described further below), and a scheduled charging day are calculated.

The setting of the target SOC (target remaining capacity), which is the necessary remaining capacity, takes into consideration cyclical deterioration, which is deterioration of the battery 30 that becomes greater as the number of charges and discharges increases, and storage deterioration (idle deterioration at a high SOC), which is deterioration of the battery 30 that becomes greater as the idle time during which the battery 30 is near a full charge becomes longer. Such cyclical deterioration and idle deterioration at a high SOC of the battery 30 are widely known.

In the present embodiment, the target SOC is set in consideration of the idle deterioration of the battery 30. A maximum value of the remaining capacity is set to an SOC enabling the greatest suppression of idle deterioration, in an SOC region having a range from the minimum necessary remaining capacity SOC_min to a full charge capacity. It is preferable to restrict the SOC to be less than the full charge capacity. Therefore, in the present embodiment, it is assumed that the minimum necessary remaining capacity SOC_min is 70 [%], and this 70 [%] value is set as the target SOC, as shown in FIG. 5A.

When describing this target SOC of 70 [%] in comparison to an irregular target SOC (also referred to as a corrected target SOC) described further below, this target SOC may be referred to as a target SOC for a typical time or a typical target SOC.

In the charging plan of FIG. 5A, in order to prevent a drop in the convenience for the user due to an increase in the number of charges, the charging frequency that can be tolerated by the user is set such that two days worth of the consumption amount can be covered by the one-time typical charging amount ΔSOC_typ. A drop in the convenience for the user due to an increase in the number of charges refers to an increase in the number of times the charging plug 32 is attached to and removed from the charging port 36 of the electric vehicle 10 by the user.

As a result of the above, the scheduled charging day is set to once every two days in FIG. 5A. That is, in FIG. 5A (typical usage charging plan), the battery 30 is charged so that the remaining capacity SOC becomes the target SOC after returning on each of Tuesday (Tue), Thursday (Thu), and Saturday (Sat). In FIG. 5A, the charging day coming after Saturday is the following Monday (not shown in the drawings).

The charging plan for the case of typical usage is shown by the characteristic lines indicated by the single-dot chain lines in FIG. 5A. These characteristic lines of the single-dot chain lines indicate a charging plan in which charging is performed every two days with the typical charging amount ΔSOC_typ, from the lower limit SOC set to eliminate worry about an electricity shortage to the target SOC that avoids idle deterioration in a high SOC state where deterioration of the battery 30 accelerates easily. The high SOC at which deterioration of the battery 30 accelerates easily includes a fully charged state.

Next, at step S8, setting information concerning the intent of the user with regard to the charging operation (priority ranking for electricity cost and charging effort) is acquired. In this case, the constraint condition is determined according to whether a low electricity cost is to be prioritized (electricity cost priority) or a reduction of effort (number of charges, charging frequency) is to be prioritized, based on input from the user. Here, the effort refers to the series of operations of attaching and removing the charging plug 32, which is connected to the charging equipment 14 through the charging cord 34, to and from the charging port 36 and performing charging, as described above.

The default setting by the charging control apparatus 22 prioritizes the electricity cost when the charging control apparatus 22 has acquired electricity cost information. This default setting can be changed by the user through the smart device 20 or the on-board HMI, for example.

Next, at step S9, the constraint condition of the charging amount ΔSOC with regard to the electricity cost is determined based on the electricity cost information (details are described in steps S10 and S11).

Next, at step S10, the timing at which charging can be started (charging startable timing) is predicted from the trend of the timing at which the electric vehicle 10 is connected to the charging equipment 14. A maximum charging amount ΔSOC_max, which is a maximum charging amount that can be achieved with one charging from the predicted charging startable timing (e.g. 7:00 PM after returning) to a charging endable timing (e.g. 7:00 AM on the following day) is calculated.

As an example, it is assumed that the judging section 42 judges there to be a trend that the charging plug 32 is attached to the charging port 36 before 6:00 PM and removed after 7:00 AM on the following day, from the record (usage history) in the storage section 40. In this case, the maximum charging amount ΔSOC_max is calculated to be the product of the time from 7:00 PM to 7:00 AM on the following day and the unit time charging amount.

In this case, the maximum charging amount ΔSOC_max is calculated as a total charging amount that is the sum of the charging amount achieved by power received late at night (e.g. 11:00 PM to 7:00 AM), which is a priority time period during which the electricity cost is low, and the charging amount achieved by power received in the evening (e.g. 7:00 PM to 11:00 PM), during which the electricity cost is relatively high.

Next, at step S11, a low-cost charging amount ΔSOC_lowcost, which is a maximum charging amount that can be achieved by only the power received late at night (8 hours from 11:00 PM to 7:00 AM) that is the priority time period during which the electricity cost is low and that falls within the time period from the charging startable timing (7:00 PM) to the departure timing (7:00 AM on the following day), is calculated. Regarding the low-cost charging amount ΔSOC_lowcost, see FIG. 5A.

The low-cost charging amount ΔSOC_lowcost is calculated as the product of the amount of time within the time period from 11:00 PM to 7:00 AM on the following day, and the unit time charging amount.

Next, at step S12, a judgment is made as to whether there is an irregular usage plan for the electric vehicle 10 already set by the next scheduled charging day.

If there is no irregular usage plan (step S12: NO), at step S13, a necessary remaining capacity SOC_req is set to the minimum necessary remaining capacity SOC_min, and the process proceeds to step S15. This necessary remaining capacity SOC_req is also referred to simply as the necessary SOC.

On the other hand, if there is an irregular usage plan (step S12: YES), at step S14, the destination on the specified day ("Sat" in FIGS. 6 to 9) is acquired from a calendar or navigation setting information. Then, the necessary remaining capacity SOC_req, which is the remaining capacity necessary for roundtrip travel to and from the destination (including cases where the outgoing route differs from the return route), is calculated, and the process proceeds to step S15.

Next, at step S15, a judgment is made as to whether the necessary remaining capacity SOC_req is less than or equal to the target SOC (typical target SOC). If the SOC_req is less than or equal to the target SOC (step S15: YES) (and if the setting of step S13 has been performed), charging control is performed with a charging pattern according to a first control mode at step S16.

[First Control Mode] (SOC_req≤target SOC)

The first control mode will be described using three patterns, which are typical usage of FIG. 5A, atypical usage 1*a* of FIG. 5B (effort reduction priority), and atypical usage 1*b* of FIG. 5C (electricity cost priority).

[Typical Usage (FIG. 5A)]

As shown in FIG. 5A, the low-cost charging amount ΔSOC_lowcost is a maximum charging amount that can be achieved for the battery 30 with one charging in the time period during which the electricity cost is low (11:00 PM to 7:00 AM). Here, the low-cost charging amount ΔSOC_lowcost is a charging amount that exceeds (covers) the typical charging amount ΔSOC_typ (target SOC−lower limit SOC) of two days of use.

The maximum charging amount ΔSOC_max is a maximum charging amount that can be achieved for the battery 30 with one charging until the next usage timing (usage on the following morning) without considering the electricity cost, and is a large charging amount that exceeds the low-cost charging amount ΔSOC_lowcost.

As described above, the maximum charging amount ΔSOC_max is calculated as shown in Expression (1) below.

$$\Delta SOC\_max = \Delta SOC\_lowcost \text{ (8 hours from 11:00 PM to 7:00 AM)} + \Delta SOC\_highcost \text{ (4 hours from 7:00 PM to 11:00 PM)} \quad \text{Expression (1):}$$

The lower limit SOC is temporarily set at step S4 to an SOC threshold value that does not cause the user to worry about an electricity shortage. However, if the lower limit SOC value calculated in step S4 as described above is less than a value obtained by subtracting the low-cost charging amount ΔSOC_lowcost from the target SOC (default lower limit SOC=target SOC−low-cost charging amount ΔSOC_lowcost), the lower limit SOC is set to this value (default lower limit SOC).

As shown by the lower limit SOC in FIGS. 5A, 5B, and 5C, it is also possible for the user to set the lower limit SOC to an arbitrary user setting value that is slightly higher than the default lower limit SOC, according to the degree of worry about an electricity shortage felt by the user.

When the judging section 42 detects that the charging plug 32 has been attached (connected) to the charging port 36 at a prescribed location (the location of the charging equipment 14 at or near the home 80), the first control using the charging plan of the typical usage (FIG. 5A), the atypical usage 1a (FIG. 5B), or the atypical usage 1b (FIG. 5C) is implemented by the implementing section 44.

Here, the atypical usage 1a (FIG. 5B) and the atypical usage 1b (FIG. 5C) correspond to cases where the SOC at the return time (return SOC) is significantly below the lower limit SOC set in step S4.

Outside of the prescribed location, none of the control modes using the charging plans of the typical usage (FIG. 5A), the atypical usage 1a (FIG. 5B), and the atypical usage 1b (FIG. 5C) are implemented. If a charging plug (not shown in the drawings) of charging equipment (not shown in the drawings) outside the prescribed location is attached to the charging port 36 of the electric vehicle 10, the charging control apparatus 22 implements a control mode that immediately starts charging up to the target SOC.

When the first control mode in which the target SOC is set to a certain value is implemented, if the remaining capacity SOC of the battery 30 drops below a value of (lower limit SOC+ΔSOC_use), charging up to the target SOC is performed. If the remaining capacity SOC of the battery 30 has not dropped below the value of (lower limit SOC+ΔSOC_use), charging is not performed. It should be noted that ΔSOC_use is the consumption amount for the following day predicted from the past travel history.

The control continues even in a case where the charging plug 32 is not attached to the charging port 36 on a day when charging is not performed (for example, on Monday (Mon), Wednesday (Wed), Friday (Fri), and Sunday (Sun) in FIG. 5A).

If the remaining capacity SOC at the return time has dropped below the value of (lower limit SOC+ΔSOC_use), a "charging required" notification is provided to the user through the smart device 20 or the on-board HMI, in order to prompt the user to attach the charging plug 32 to the charging port 36.

In this sense, the value of (lower limit SOC+ΔSOC_use) also functions as a charging recommendation SOC for prompting the user to charge the electric vehicle 10.

In the control mode realized by the typical usage charging plan of FIG. 5A, the entire typical charging amount ΔSOC_typ is covered within a range of the low-cost charging amount ΔSOC_lowcost for which the electricity cost is low.

[Atypical Usage 1a (Effort Reduction Priority Using ΔSOC_max)]

The following describes the control mode realized by the charging pattern of atypical usage 1a, which reflects the desire of the user to prioritize a reduction in effort, while referencing FIG. 5B.

Focus is placed on Wednesday in FIG. 5B. It is assumed that the electric vehicle 10 is used for travel on Wednesday despite there being no plan for this travel on this day in the schedule table of the storage section 40, and that the amount of power consumed on Wednesday resulted in an SOC significantly below the lower limit SOC.

In this case, the charging amount needed to charge up to the target SOC during the time period from the return time on Wednesday to the morning on Thursday is the charging amount (necessary charging amount) ΔSOC. However, the low-cost charging amount ΔSOC_lowcost during the time period from the return time on Wednesday to the morning on Thursday is less than the necessary charging amount ΔSOC (ΔSOC>ΔSOC_lowcost), and therefore the target SOC cannot be reached with one charging.

In FIG. 5B, the length of the one-dot chain line segment extending vertically above "Thu" indicates the necessary charging amount ΔSOC, the lower end of this line segment indicates the remaining capacity SOC at the return time, and the upper end of this line segment indicates the departure time remaining capacity SOC on Thursday. The same is true for Tuesday and Saturday.

Given the return time remaining capacity SOC on Wednesday, if charging with the low-cost charging amount ΔSOC_lowcost cannot be completed by the departure time on Thursday, the charging control apparatus 22 notifies the smart device 20 of the user to check whether to perform charging with a preference for prioritizing effort reduction or charging with a preference for prioritizing the electricity cost.

The timing of the notification provided to the smart device 20 by the charging control apparatus 22 may be such that the notification begins at a timing t1 (see FIG. 5B) at which the remaining capacity SOC drops below the value of (lower limit SOC+ΔSOC_use) and continues until a response to the notification is confirmed or the charging plug 32 is attached to the charging port 36 at the return time on Wednesday.

The preference for prioritizing effort reduction or the preference for prioritizing electricity cost can be set in advance through the on-board HMI (the HMI using the display section 23, the manipulating section 64, and the audio output section 66 of the navigation apparatus 24) or the smart device 20.

If a preference for prioritizing effort reduction is selected, the control mode realized by the charging pattern of the atypical usage 1a of FIG. 5B is implemented.

In this case, charging is performed prioritizing the range of the low-cost charging amount ΔSOC_lowcost covered by late night charging from the return time on Wednesday to the morning on Thursday. The charging plan is changed such that the lacking charge amount is charged in a range of the maximum charging amount ΔSOC_max between 7:00 PM and 11:00 PM, and then charging is performed.

For example, if 10 hours of charging time are necessary to reach the target SOC, the initial two hours of charging are performed during the evening time period during which the electricity cost is high. The remaining eight hours of charging are performed from 11:00 PM to 7:00 AM when the electricity cost is low.

With the atypical usage 1a (effort reduction priority) shown in FIG. 5B, charging up to the target SOC is realized with one charging within the range of the maximum charging amount ΔSOC_max, and the number of charges is not increased. In other words, the number of times that the user attaches the charging plug 32 to the charging port 36 is once every two days and does not increase from the typical usage (FIG. 5A). As a result, the effort involved with charging by the user such as the operation of attaching the charging plug 32 to the charging port 36 is reduced.

[Atypical Usage 1b (Electricity Cost Priority Using ΔSOC_lowcost)]

On the other hand, if a preference for prioritizing electricity cost is selected, the control mode realized by the charging pattern of the atypical usage 1b of FIG. 5C is implemented.

In this case, the remaining capacity SOC is permitted to be less than the target SOC during the charging from the return time on Wednesday to the departure time on Thursday (in FIG. 5C, the charging amount ΔSOC is set such that ΔSOC=ΔSOC_lowcost).

Specifically, charging is performed entirely in the range of the low-cost charging amount ΔSOC_lowcost from the return time on Wednesday to the departure time on Thursday. Furthermore, the target SOC is reached within the range of the low-cost charging amount ΔSOC_lowcost from the return time on Thursday to the departure time on Friday. In other words, charging is performed a plurality of times.

In this case, the number of charges increases by the charging performed for the lacking SOC at the return time on Thursday (the timing indicated as "Fri" in FIG. 5C). As a result, the effort involved with charging by the user such as the operation of attaching the charging plug 32 to the charging port 36 increases, but the electricity cost can be kept relatively low compared to the charging control of the atypical usage 1a (effort reduction priority) of FIG. 5B.

If there is a schedule to consume the amount of power on Friday such that the remaining capacity SOC falls below the value of (lower limit SOC+ΔSOC_use), the charging may be performed according to the charging pattern of FIG. 5B instead of the charging pattern of FIG. 5C.

The charging pattern of FIG. 5C is a charging pattern that uses only the low-cost charging amount ΔSOC_lowcost, and the charging pattern of FIG. 5B is a charging pattern that uses the range of the maximum charging amount ΔSOC_max, which exceeds the range of the low-cost charging amount ΔSOC_lowcost.

In this way, even when the atypical usage 1b (electricity cost priority) is set, it is possible to switch to a charging pattern that uses the range of the maximum charging amount ΔSOC_max.

[Second Control Mode] (Necessary Remaining Capacity SOC_req>Target SOC)

At step S15 of FIG. 4, when the necessary remaining capacity SOC_req exceeds the target SOC (step S15: NO), charging control is performed with a charging pattern according to a second control mode of step S17.

Specifically, at step S17, charging control is performed with the charging pattern according to the second control mode in which the target SOC is corrected to be a higher value and charging up to the corrected target SOC is required (necessary remaining capacity SOC_req=corrected target SOC>target SOC).

The second control mode will be described using charging patterns of atypical usage 2a of FIG. 6 (electricity cost priority), atypical usage 2b of FIG. 7 (effort reduction priority), and atypical usage 2c of FIG. 8 (effort reduction priority and deterioration suppression priority).

Figure 6:
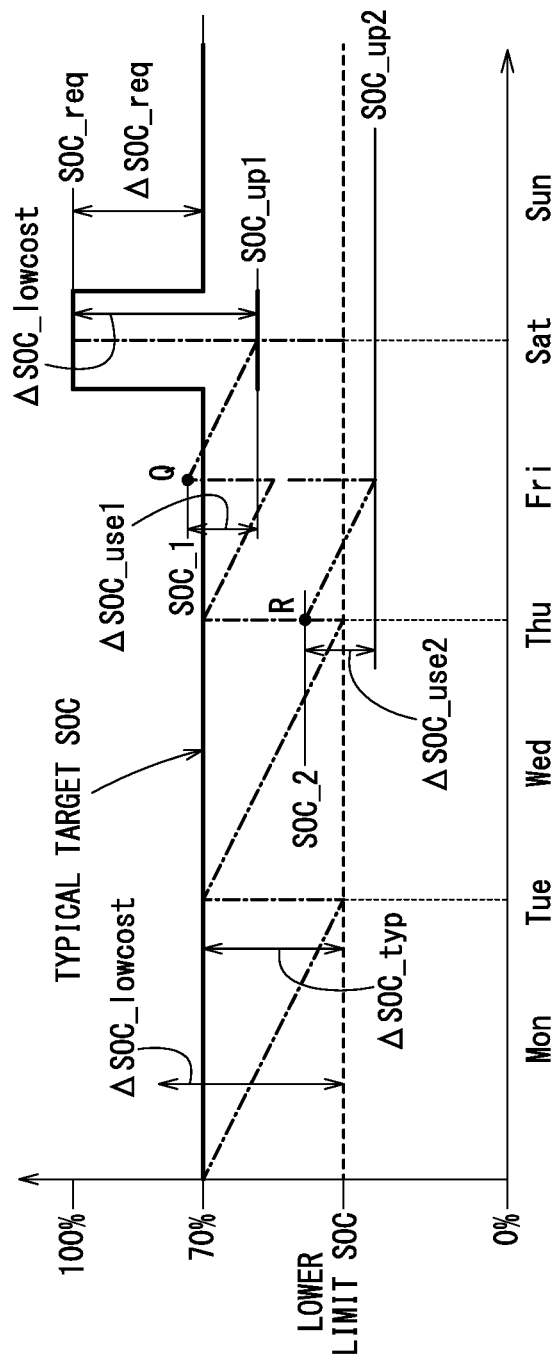
FIG. 6 is a time chart of the electricity cost priority control in a case where the target remaining capacity is increased.

In FIGS. 6 to 8, the necessary remaining capacity SOC_req obtained by correcting the target SOC to be a higher value becomes a remaining capacity SOC near 100 [%] and causes temporarily the deterioration of the battery 30 to accelerate.

In FIGS. 6 to 8, the destination on the specified day ("Sat" in FIGS. 6 to 8) is acquired from the calendar or navigation setting information by the return time on Monday (lower end of the line segment above "Tue" in FIGS. 6 to 8). Then, the necessary remaining capacity SOC_req (also referred to as the corrected target SOC), which is the remaining capacity necessary for travel to the destination, is calculated by the return time on Monday.

As shown in FIGS. 6 to 8, the necessary remaining capacity SOC_req, which is the corrected target SOC, is a remaining capacity obtained as the sum of a charging amount ΔSOC_req and the target SOC before correction, as shown in Expression (2) below.

$$\text{SOC\_req} = \text{target SOC} + \Delta\text{SOC\_req} \quad \text{Expression (2):}$$

In this case, it is necessary to charge up to the necessary remaining capacity SOC_req by the departure time on Saturday ("Sat" in FIGS. 6 to 8). Therefore, if the remaining capacity SOC at the return time on Friday ("Sat" in FIG. 6) is less than or equal to SOC_req, charging needs to be performed. In other words, the threshold value for judging whether to perform charging at the return time on Friday ("Sat" in FIG. 6) becomes the necessary remaining capacity SOC_req.

[Atypical Usage 2a (FIG. 6): Electricity Cost Priority]

As shown in FIG. 6, when the user sets the atypical usage 2a (electricity cost priority setting), charging can only be performed in the range of the low-cost charging amount ΔSOC_lowcost with one charging. Therefore, the SOC at the return time on Friday ("Sat" in FIG. 6) needs to be greater than a lowest remaining capacity SOC_up1, which is higher than the lower limit SOC.

In this way, it is necessary to perform back-calculating from the specified day (Saturday), and this back-calculating procedure is described with reference to FIGS. 9A to 9D in addition to FIG. 6.

As shown in FIGS. 6 and 9A (back-calculating procedure 1) and Expression (3) below, the lowest remaining capacity SOC_up1 is a value obtained by subtracting the low-cost charging amount ΔSOC_lowcost from the corrected target SOC (SOC_req).

$$\text{SOC\_up1} = \text{SOC\_req} - \Delta\text{SOC\_lowcost} \quad \text{Expression (3):}$$

The lowest remaining capacity SOC_up1 may be a remaining capacity with a value obtained by adding a control margin that takes control error into consideration, to the value obtained by subtracting the low-cost charging amount ΔSOC_lowcost from the corrected target SOC. The same is true below as well.

Next, as shown in FIGS. 6 and 9B (back-calculating procedure 2), the SOC at the return time on Friday ("Sat" in FIGS. 6 and 9B) is made greater than or equal to the lowest remaining capacity SOC_up1. To achieve this, if the consumption amount on Friday is a consumption amount ΔSOC_use1, the battery 30 needs to be charged up to a value of (SOC_up1+ΔSOC_use1) indicated by the point Q by the departure time on Friday ("Fri" in FIGS. 6 and 9B).

Therefore, if the remaining capacity SOC at the return time on Thursday ("Fri" in FIG. 9B) is less than or equal to the value of (SOC_up1+ΔSOC_use1), charging needs to be performed (added) at the return time on Thursday ("Fri" in FIG. 9C), as shown in FIG. 9C (back-calculating procedure 3).

In this case, a threshold value (remaining capacity threshold value SOC_1) for judging whether to end the charging at the return time on Thursday ("Fri" in FIG. 9C) is a value expressed by Expression (4) below and indicated by the point Q in FIG. 9C.

$$\text{SOC\_1} = \text{SOC\_up1} + \Delta\text{SOC\_use1} \quad \text{Expression (4):}$$

As shown in Expression (5) below, the SOC at the return time on Thursday ("Fri" in FIG. 9C) is a lowest remaining capacity SOC_up2 with a value obtained by subtracting the low-cost charging amount ΔSOC_lowcost from the remaining capacity threshold value SOC_1.

$$\text{SOC\_up2} = \text{SOC\_1} - \Delta\text{SOC\_lowcost} \quad \text{Expression (5):}$$

With the same reasoning, as shown in FIG. 9D (back-calculating procedure 4), if the consumption amount on Thursday is a consumption amount ΔSOC_use2, the battery 30 needs to be charged up to a value of (SOC_up2+ΔSOC_use2) shown by the point R in FIG. 9D by the departure time on Thursday ("Thu" in FIG. 6).

In this case, if the remaining capacity SOC at the return time on Wednesday ("Thu" in FIG. 9D) is less than or equal to the value of (SOC_up2+ΔSOC_use2), charging needs to be performed (added). In this case, a threshold value (remaining capacity threshold value SOC_2) for judging whether to end the charging is a value expressed by Expression (6) below.

$$SOC\_2 = SOC\_up2 + \Delta SOC\_use2 \quad \text{Expression (6):}$$

As shown in FIG. 9D, since the remaining capacity threshold value SOC_2 is below the typical target SOC, the back-calculating is ended.

As shown in FIG. 6, back-calculating is performed from the scheduled charging day (Sat) for which the corrected target SOC (SOC_req) has been set, and the remaining capacity threshold value SOC for judging whether to perform charging at the return time is calculated by repeating the back-calculating for 1 day earlier (Fri), 2 days earlier (Thu), . . . , and n days earlier from the scheduled charging day for which the corrected target SOC (SOC_req) has been set until a day (n days earlier) when a lowest SOC_upn at the return time exceeds the lower limit SOC. In the present embodiment, "n days earlier" is "Thu" in FIG. 6, where n=2.

In other words, the lowest SOC_upn at the return time for judging whether to perform charging is corrected to be a value higher than the lower limit SOC from Wednesday to the return time on Friday ("Thu" to "Sat" in FIG. 6).

As shown in FIG. 6, since the remaining capacity SOC at the return time on Thursday ("Fri" in FIG. 6) is less than a value of (return time SOC_up1+ΔSOC_use1), a schedule to perform charging from the return time on Thursday to the departure time on Friday is added.

In this case, as shown in FIG. 6, the target SOC (point Q in FIG. 6) is corrected to be a value obtained by adding a charging amount that is less than or equal to the low-cost charging amount ΔSOC_lowcost to the remaining capacity SOC at the return time on Thursday ("Fri" in FIG. 6).

Accordingly, if the consumption amount for Friday is the consumption amount ΔSOC_use1, charging needs to be performed up to a remaining capacity (ΔSOC_use1+SOC_up1) at the departure time on Friday.

As described above, it is assumed that the plan for Saturday (plan changing the target SOC to the necessary remaining capacity SOC_req) has been acquired by the return time on Monday, as an example. Then, the remaining capacity SOC at the return time on each day from Tuesday to Saturday is predicted based on the scheduled power consumption amount for each day.

If the predicted remaining capacity SOC is predicted to drop below the lower limit SOC (or a remaining capacity SOC_up at the return time), the day on which this will occur is set as the scheduled charging day, and the charging plan is modified such that charging is performed up to a remaining capacity threshold value SOC_n that exceeds the target SOC.

Specifically, the charging plan shown by the single-dot chain lines is changed from Thursday in FIG. 6. By gradually increasing the remaining capacity SOC until the day (Friday) immediately before the specified day (Saturday) based on the calendar or navigation setting information while performing charging within the range of the low-cost charging amount ΔSOC_lowcost, it is possible to charge up to the necessary remaining capacity SOC_req, which is enough to prevent any problems with the travel plan on Saturday, with the low-cost charging amount ΔSOC_lowcost by the departure time on Saturday.

In this way, the return time remaining capacity SOC_upn is corrected from the lower limit SOC, and the target SOC is corrected to be the remaining capacity threshold value SOC_n. As a result, as shown in FIG. 6, also in the control mode realized by the atypical usage charging plan in which the corrected target SOC is set to be higher than in the initial plan, it is possible for the entire charging amount to be covered within the range of the low-cost charging amount ΔSOC_lowcost for which the electricity cost is low. Furthermore, it is possible to perform charging within the range of the low-cost charging amount ΔSOC_lowcost while keeping the remaining capacity out of the high SOC region, where deterioration significantly accelerates, as much as possible.

To summarize FIG. 6, the SOC_req, which is the necessary remaining capacity at the departure time (charging end time) on Saturday exceeds the typical target SOC, and therefore the target SOC is corrected such that the target value becomes SOC_req.

Furthermore, the remaining capacity threshold value SOC_1 at the departure time (charging end time) on Friday, which takes into consideration the consumption amount ΔSOC_use1 for Friday, exceeds the typical target SOC, and therefore the target SOC is corrected such that the target value becomes SOC_1 (=Q).

Yet further, the remaining capacity threshold value SOC_2 at the departure time (charging end time) on Friday, which takes into consideration the consumption amount ΔSOC_use2 for Friday described with reference to FIG. 9D, is below the typical target SOC, and therefore charging should be performed up to the typical target SOC at the return time on Wednesday ("Thu" in FIG. 6).

In this case, the lowest remaining capacity SOC_up2 and consumption amount ΔSOC_use2, which are calculated for the back-calculating with reference to FIG. 9D in which the consumption amount and the charge amount are shown by one-dot chain lines, are not reflected in the charging plan.

[Atypical Usage 2b (FIG. 7): Effort Reduction Priority]

In a case where control is performed with effort reduction priority used when the user wants to reduce the effort of charging, the charging plan is changed such that, instead of charging at the return time on Thursday ("Fri" in FIG. 7), the battery 30 is charged up to the necessary remaining capacity SOC_req in the range of the maximum charging amount ΔSOC_max, with a charging amount of one instance of charging from the return time on Friday to before the departure time on Saturday.

In this case, since the charging up to the maximum charging amount ΔSOC_max can be achieved with one instance of charging, as shown in FIG. 7, a return time SOC_up1' is calculated as shown in Expression (7) below by using the same technique as used for the calculation of the return time SOC_up1 of FIG. 6 and replacing the low-cost charging amount ΔSOC_lowcost with the maximum charging amount ΔSOC_max.

$$\text{return time SOC\_up1'} = \text{necessary remaining capacity} \\ \text{SOC\_req} - \Delta\text{SOC\_max} \quad \text{Expression (7):}$$

Since the charging operation is not performed on Friday, a remaining capacity threshold value for Thursday (remaining capacity threshold value SOC_2' at the point Q in FIG. 7) is set to a value of {SOC_up1'+ΔSOC_use1 (Friday consumption amount)+ΔSOC_use2 (Thursday consumption amount)}.

In the example of FIG. 7, the remaining capacity threshold value SOC_2' is less than a value of (lower limit SOC+ΔSOC_lowcost), and therefore charging up to the remaining capacity threshold value SOC_2' is performed at the return time on Wednesday in the range of the low-cost charging amount ΔSOC_lowcost.

By controlling the charging in this way, the electricity cost becomes higher than in the case of the electricity cost priority control of FIG. 6, but the number of times the charging operation is performed does not increase and remains the same as in the typical usage shown in FIG. 5.

[Atypical Usage 2c (FIG. 8): Deterioration Suppression Priority Control]

With the electricity cost priority control of FIG. 6 and the effort reduction priority control of FIG. 7, the number of times and frequency with which the necessary remaining capacity SOC_req exceeds the target SOC where the deterioration is most strongly suppressed increase, such as at the departure time on Friday (FIG. 6) or the departure time on Thursday (FIG. 7), in addition to the departure time on Saturday. When the battery 30 is charged up to a remaining capacity that exceeds the target SOC, the battery 30 experiences temporarily accelerated deterioration.

In this case, as shown in FIG. 8, a charging plan is set by which the number of charges is increased but the remaining capacity threshold value SOC_n after charging is prevented from exceeding the target remaining capacity.

Specifically, a remaining capacity (SOC_up1'+ΔSOC_use1) at the departure time on Friday is calculated by adding the consumption amount ΔSOC_use1 for Friday to the remaining capacity SOC_up1' at the return time on Friday, which is calculated by subtracting the maximum charging amount ΔSOC_max from the necessary remaining capacity SOC_req. Furthermore, if a remaining capacity (SOC_up1'+ΔSOC_use1+ΔSOC_use2), obtained by adding the consumption amount ΔSOC_use2 for Thursday to the remaining capacity at the departure time on Friday is predicted to exceed the target capacity, a charging threshold value SOC_3 at the return time on Thursday is set to the remaining capacity shown in Expression (8) below.

$$SOC\_3 = SOC\_up1' + \Delta SOC\_use1 \quad \text{Expression (8)}$$

In this case, the charging amount at the return time on Wednesday may be ΔSOC_use2, and a charging threshold value SOC_4 for Thursday may be a value obtained by adding the consumption amount ΔSOC_use2 for Thursday to the lower limit SOC.

According to the charging control of FIG. 8, the deterioration of the battery 30 is suppressed to the minimum.

In other words, the lowest SOC and the target SOC are corrected. As a result, also in the control mode realized by the atypical usage charging plan in which the corrected target SOC (SOC_req) is set to be higher than in the initial plan, it is possible to reliably charge up to the necessary remaining capacity SOC_req on the specified day based on the calendar or navigation setting information. With this deterioration suppression priority control of the atypical usage 2c, it is possible to perform charging up to the necessary remaining capacity SOC_req without increasing the number of charges while strictly avoiding the high SOC region in which the deterioration accelerates significantly.

[Comprehensive Description of the Second Control Mode]

The second control mode of step S17 (FIG. 4) described above is described comprehensively while referencing the flow chart of FIG. 10.

At step S17a, a judgment is made as to whether there is a desire to prioritize a reduction of the number of charges over the electricity cost. If there is such a desire (step S17a: YES), at step S17c, a plan enabling charging within the maximum charging amount ΔSOC_max on a plurality of scheduled charging days before the specified day is recalculated.

On the other hand, at step S17a, if there is a desire to prioritize the electricity cost (step S17a: NO), at step S17b (described in detail further below), a plan enabling charging within the low-cost charging amount ΔSOC_lowcost on a plurality of scheduled charging days before the specified day is recalculated.

In both of the above cases, a judgment is made at step S17d as to whether it is possible to charge the necessary charging amount by performing charging on only the schedule charging days. If this judgment is negative (step S17d: NO), at step S17e, the number of scheduled charging days is increased, and from steps S17a and onward, recalculation is performed until the judgment at step S17d becomes affirmative.

FIG. 11 is a flow chart showing a general control procedure for setting the target SOC for the electricity cost priority (atypical usage 2a of FIG. 6) of step S17b. The example of the control procedure has been described above with reference to FIGS. 6 and 9A to 9D.

At step Sa, the date and time ("Sat" in the example of FIG. 6) on which the remaining capacity needs to be up to the necessary remaining capacity SOC_req is acquired.

At step Sb, a judgment is made as to whether the necessary remaining capacity SOC_req is greater than the typical target SOC, and if the necessary remaining capacity SOC_req is less than or equal to the typical target SOC (SOC_req≤target SOC) (step Sb: NO), the process proceeds to step S17d (FIG. 10).

If the necessary remaining capacity SOC_req is greater than the typical target SOC (SOC_req>target SOC) (step Sb: YES), at step Sc, an initial value of "1" is substituted for "m" in "m repetitions" (m is an integer).

At step Sd, SOC_up(m), which is SOC_up1 in this case (see FIG. 9A, SOC_up1=SOC_req−ΔSOC_lowcost), is calculated.

Next, at step Se, in order to perform the back-calculating, a consumption amount ΔSOC_use(m) (SOC_1 in FIG. 9B), which is an estimated consumption amount for the following day acquired in advance based on the habit of the user, is acquired.

Next, at step Sf, a remaining capacity threshold value (remaining capacity setting value) SOC_(m) (in FIG. 9B, SOC_1=SOC_up1+ΔSOC_use1), which is the target SOC (remaining capacity threshold value for judging whether to end the charging on the day) at the departure time (charging end time) on the previous day ("Fri" in FIG. 9B), is calculated (back-calculated).

Next, at step Sg, a judgment is made as to whether the calculated remaining capacity threshold value SOC_(m) is greater than the typical target SOC. If it is greater (step Sg: YES), the variable m is increased to m+1 and the calculation (steps Sd, Se, Sf, Sg: YES, and Sh) is repeated while moving back the day until the judgment at step Sg is that the remaining capacity threshold value SOC_(m) is less than or equal to the target SOC (when typical) (step Sg: NO).

When the judgment at step Sg has become negative, the charging plan is determined as shown below in step Si.

The charging plan is determined such that {target SOC (req)=SOC_req, target SOC (1)=SOC_1, . . . , target SOC (m−1)=SOC_m−1}.

In other words, the target SOC (remaining capacity threshold value) is corrected on only the days on which charging that exceeds the typical target SOC is needed.

[Modification]

The embodiment described above can be modified in the following manner.

Figure 12:
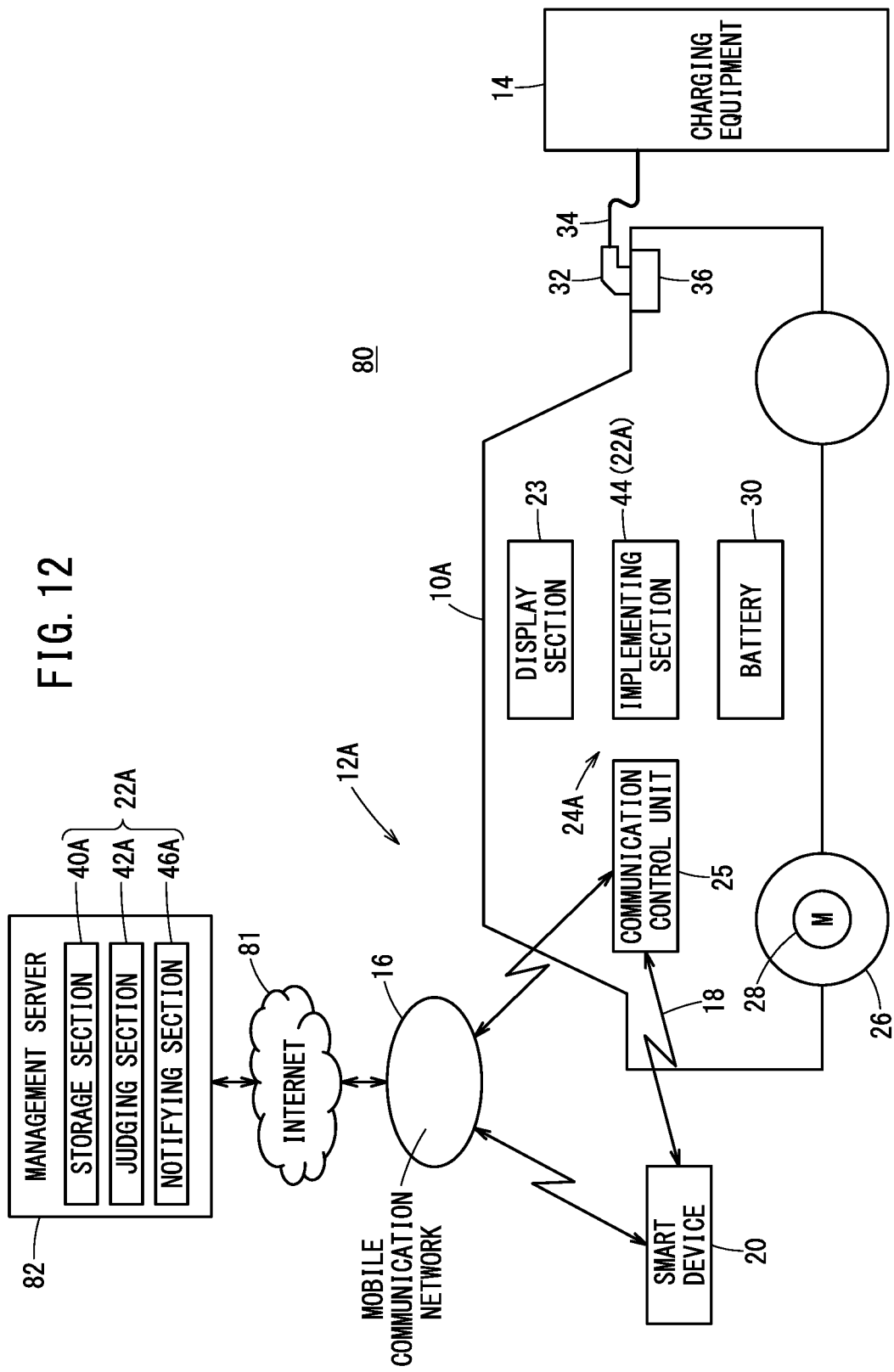
FIG. 12 is a system diagram showing a configuration of a system according to a modification in which a charging control apparatus, excluding an implementing section, is mounted in a management server on the Internet.

FIG. 12 is a system diagram showing a configurational example of a system 12A in which a portion of a charging control apparatus 22A is mounted in the management server 82 on the Internet 81.

The implementing section 44 is mounted in an electric vehicle 10A as a remaining portion of the charging control apparatus 22A. On the other hand, a storage section 40A, a judging section 42A, and a notifying section 46A, excluding the implementing section 44, are mounted as the charging control apparatus 22A of the management server 82.

In the system 12A of FIG. 12, the electric vehicle 10A includes the communication control unit 25, and the communication control unit 25 is wirelessly connected to the Internet 81 via the mobile communication network 16, and transmits and receives data to and from the management server 82 via the Internet 81, through a public communication network (not shown in the drawings).

The management server 82 collects various types of vehicle information (including information concerning each piece of charging equipment 14 connected to each electric vehicle 10A) from a plurality of electric vehicles 10A, via the Internet 81, and accumulates the information in the storage section 40A that is a database.

When the battery 30 of the electric vehicle 10A needs to be charged, the management server 82 notifies the smart device 20 of the owner of the electric vehicle 10A of this fact via the Internet 81. In this case, a text reading "Please charge your car", for example, is displayed in the display section of the smart device 20.

In the system 12 of FIG. 1 as well, when the battery 30 needs to be charged, the smart device 20 is notified of this fact from the communication control unit 25 via the mobile communication network 16.

In the system 12A of FIG. 12, the storage section 40A, the judging section 42A, and the notifying section 46A are mounted in the management server 82 connected to the Internet 81, and the implementing section 44 is mounted in a navigation apparatus 24A. The implementing section 44 may also be mounted in the management server 82.

The storage section 40A, the judging section 42A, and the notifying section 46A have the same configurations and effects as the storage section 40, the judging section 42, and the notifying section 46 of FIG. 1. The differing point is that the storage section 40, the judging section 42, and the notifying section 46 of the electric vehicle 10 shown in FIG. 1 are involved with charging control for only the electric vehicle 10, while the storage section 40A, the judging section 42A, and the notifying section 46A of the management server 82 shown in FIG. 12 are involved with charging control for the plurality of electric vehicles 10A.

The configurations and effects of portions of the storage section 40A, the judging section 42A, and the notifying section 46A of the management server 82 that are involved independently with the battery 30 of each electric vehicle 10A are the same as the effects of the storage section 40, the judging section 42, and the notifying section 46 of the electric vehicle 10 shown in FIG. 1.

In other words, the storage section 40A of the management server 82 collects, from the plurality of electric vehicles 10A, a usage history of each electric vehicle 10A via the Internet 81, and accumulates this usage history in the management server 82 for each electric vehicle 10A.

The judging section 42A determines usage patterns of the electric vehicle 10A on a per day basis, makes a judgment as to whether charging of the battery 30 is necessary for each individual electric vehicle 10A based on the determined usage patterns, and calculates the charging amount of the battery 30 when charging is necessary.

Information concerning judgment performed by the judging section 42A for each individual electric vehicle 10A as to whether charging of the battery 30 is necessary and concerning the charging amount of the battery 30 calculated when charging is judged to be necessary is transmitted to the implementing section 44 of each electric vehicle 10A via the Internet 81.

The implementing section 44 of each electric vehicle 10A has the same configuration and effect as the implementing section 44 of the electric vehicle 10 in FIG. 1. The following describes the differing point between the embodiment of FIG. 1 and the modification of FIG. 12. The implementing section 44 of the electric vehicle 10 in FIG. 1 receives the instructions concerning the charging time periods and the charging amounts during these time periods from the judging section 42 in the vehicle without passing through the communication control unit 25. In contrast to this, in the modification of FIG. 12, the implementing section 44 of each electric vehicle 10A whose charging is controlled by the management server 82 receives the instructions concerning the charging time periods and the charging amounts during these charging time periods from the judging section 42A of the management server 82 that is outside the vehicle, via the communication control unit 25.

Upon receiving instructions requesting charging of the battery 30 from the judging section 42A via the Internet 81, the implementing section 44 of each electric vehicle 10A whose charging is controlled by the management server 82 charges the battery 30 up to the remaining capacity (target SOC) indicated by the instructions from the judging section 42A.

[Invention Understandable from the Embodiments and Modification]

The invention that can be understood from the embodiment and the modification described above will be described below. The reference numerals used in the above-described embodiment and modification are affixed to constituent elements to facilitate understanding, but these constituent elements are not limited to those given these reference numerals.

A charging control method for an electric moving body according to the present invention is a charging control method for an electric moving body 10 or 10A that moves using a battery 30 as a power source, the charging control method comprising: acquiring scheduled usage of the electric moving body 10 or 10A; acquiring a necessary remaining capacity that is a charging state necessary for the scheduled usage; and if the necessary remaining capacity is not reached by a start timing of the scheduled usage, changing a charging plan set in advance prior to the acquired scheduled usage, the charging plan being changed in a manner that the necessary remaining capacity is reached by the start timing of the scheduled usage.

According to this configuration, by performing charging control to change the charging plan in accordance with the scheduled usage start timing of the electric moving body 10 or 10A so that the necessary remaining capacity is reached, and also charging the battery 30 in a manner that the remaining capacity thereof is less than or equal to the necessary charging amount in the charging control, the time during which the battery is in a state near a full charge is reduced.

As a result, the necessary remaining capacity, which is the remaining capacity needed by the scheduled usage start timing of the electric moving body 10, can be preserved in the battery 30, and therefore both convenience and deterioration suppression can be achieved.

The charging control method for the electric moving body according to the present invention may further comprise acquiring a charging plan with a low-cost charging amount $\Delta SOC\_lowcost$ that is a maximum charging amount that can be achieved by charging only in a time period during which an electricity cost is low, based on charging equipment information, a charging start timing, and a scheduled usage start timing of the electric moving body 10; and if a consumption amount of power caused by scheduled usage acquired when charging the battery 30 is greater than that caused by scheduled usage acquired previously, and the necessary remaining capacity is not reached with a charging plan of one instance of charging with the low-cost charging amount $\Delta SOC\_lowcost$ that is the maximum charging amount that can be achieved by charging only in the time period during which the electricity cost is low (FIGS. 5B and 5C), changing the charging plan to a charging plan in which a user can select one of an effort reduction priority mode (FIG. 5B) in which an increase in the number of charges is suppressed by performing charging also in a time period during which the electricity cost is not low and charging the battery up to the necessary remaining capacity that exceeds the low-cost charging amount that is the maximum charging amount that can be achieved by charging only in the time period during which the electricity cost is low, or an electricity cost priority mode (FIG. 5C) in which the battery is charged up to the necessary remaining capacity by charging a plurality of separate times only in the time period during which the electricity cost is low.

According to this configuration, when there is power consumption that is greater than the power consumption caused by typical scheduled usage, it is possible to select between the effort reduction mode that increases the electricity cost but suppresses the increase in the number of charges, and the electricity cost priority mode that increases the number of charges but suppresses the increase in the electricity cost, and therefore charging can be performed in accordance with the intent of the user.

In the charging control method for the electric moving body according to the present invention, when the user is caused to select one of the effort reduction priority mode or the electricity cost priority mode, the user may be caused to select one of the modes in advance via a terminal capable of communicating with the electric moving body 10 or, when there is power consumption that exceeds power consumption caused by typical usage, the terminal may be provided with notification that the number of charges will increase in the electricity cost priority mode and the user may be caused to select one of the modes with the notification as a trigger.

According to this configuration, when charging is performed by the user and the effort reduction priority mode that prioritizes a reduction of effort or the electricity cost priority mode that reduces the electricity cost is set based on the intent of the user, this selection can be made via the user terminal in accordance with the preference of the user (preference for prioritizing the electricity cost or preference for prioritizing the effort reduction).

A charging control method for an electric moving body 10 according to the present invention is a charging control method for an electric moving body that moves using a battery 30 as a power source, the charging control method comprising: if there are a prescribed number of days on which charging and discharging are performed a plurality of times from when a scheduled usage of the electric moving body 10 is acquired to a scheduled usage start timing, causing a user to select whether a necessary remaining capacity that is necessary at the scheduled usage start timing is to be charged immediately before the scheduled usage start timing in an electricity cost priority mode in which the battery is charged by charging with a low-cost charging amount $\Delta SOC\_lowcost$ that is a maximum charging amount that can be achieved by charging only in a time period during which an electricity cost is low, or in an effort reduction priority mode in which the battery is charged with a predetermined charging amount including a charging amount in a time period during which the electricity cost is not low; and changing a charging plan existing before a charging process is performed immediately before the scheduled usage start timing, in a manner that a remaining capacity immediately before the scheduled usage start timing in the selected charging mode becomes a remaining capacity obtained by subtracting the low-cost charging amount from the necessary remaining capacity or a remaining capacity obtained by subtracting the predetermined charging amount from the necessary remaining capacity (FIGS. 6, 7, and 8).

According to this configuration, the charging plan existing before the charging process is performed immediately before the scheduled usage start timing is changed in a manner that the remaining capacity immediately before the scheduled usage start timing according to the selected charging mode becomes a remaining capacity obtained by subtracting the low-cost charging amount from the necessary remaining capacity or a remaining capacity obtained by subtracting the charging amount larger than the low-cost charging amount from the necessary remaining capacity, and therefore it is possible to charge up to the necessary remaining capacity with the charging process immediately before the scheduled usage start timing using either the low-cost charging amount for which the electricity cost is low or the large charging amount realized in the effort reduction priority mode.

The charging control method for the electric moving body according to the present invention may further comprise, in a case where the user has selected the effort reduction priority mode, and when the necessary remaining capacity exceeds a deterioration suppression target remaining capacity, suppressing the number of charges by allowing a charging plan in which the necessary remaining capacity exceeds the deterioration suppression target remaining capacity to be included in the charging plan existing before the charging process is performed immediately before the scheduled usage start timing (FIG. 7).

According to this configuration, when the necessary remaining capacity immediately before the scheduled usage start timing exceeds the deterioration suppression target remaining capacity, the number of charges is suppressed by allowing the charging plan in which the necessary remaining capacity exceeds the deterioration suppression target remaining capacity to be included the charging plan existing before the charging process is performed immediately before the scheduled usage start timing, and therefore it is possible to adapt to the user's preference for effort reduction.

The charging control method for the electric moving body according to the present invention may further comprise, in a case where the user has selected the effort reduction priority mode, and when the necessary remaining capacity exceeds a deterioration suppression target remaining capacity, checking with the user about whether to allow a charging plan in which the necessary remaining capacity exceeds the deterioration suppression target remaining capacity to be included in the charging plan existing before the charging process is performed immediately before the scheduled usage start timing, and if not allowed by the user, notifying the user that charging is performed by increasing the number of charges.

According to this configuration, even for a user who usually selects the effort reduction priority mode in which charging is performed a small number of times, it is possible to provide a suitable option when the user does not want the battery to deteriorate.

In the charging control method for the electric moving body according to the present invention, a lower limit remaining capacity of the battery can be set by a user.

According to this configuration, the lower limit remaining capacity of the battery can be changed according to, for example, the degree of worry felt by the user about an electricity shortage.

In the charging control method for the electric moving body according to the present invention, a lower limit remaining capacity of the battery may be set to a default lower limit remaining capacity obtained by subtracting, from the necessary remaining capacity, the low-cost charging amount that is the maximum charging amount that can be achieved by charging only in the time period during which the electricity cost is low.

According to this configuration, if the electric moving body 10 or 10A is used such that the day-to-day power consumption amount is according to schedule, it is possible to charge the battery only in the time period during which the electricity cost is low.

In the charging control method for the electric moving body according to the present invention, in a case where the lower limit remaining capacity of the battery can be set by the user, and when a lower limit remaining capacity set by the user is greater than the default lower limit remaining capacity, the lower limit remaining capacity of the battery may be changed from the default lower limit remaining capacity to the lower limit remaining capacity set by the user.

According to this configuration, the lower limit remaining capacity of the battery can be changed according to, for example, the degree of worry felt by the user about an electricity shortage.

In the charging control method for the electric moving body according to the present invention, if a current remaining capacity of the electric moving body 10 or 10A is lower than the lower limit remaining capacity, the user may be notified that the current remaining capacity is lower than the lower limit remaining capacity.

According to this configuration, the user can be prompted to perform the charging start process.

An electric moving body according to the present invention is an electric moving body 10 or 10A that moves using a battery 30 as a power source and comprises a charging control apparatus 22 or 22A including a memory that stores a program, and a CPU that reads and executes the program from the memory, wherein the CPU executes the program to cause the charging control apparatus 22 or 22A to: acquire scheduled usage of the electric moving body 10 or 10A; acquire a necessary remaining capacity that is a charging state necessary for the scheduled usage; and if the necessary remaining capacity is not reached by a start timing of the scheduled usage, change a charging plan set in advance prior to the acquired scheduled usage, the charging plan being changed in a manner that the necessary remaining capacity is reached by the start timing of the scheduled usage.

According to the present invention, by performing charging control to change the charging plan in accordance with the scheduled usage start timing of the electric moving body 10 or 10A so that the necessary remaining capacity is reached, and also charging the battery in a manner that the remaining capacity thereof is less than or equal to the necessary charging amount in the charging control, the time during which the battery is in a state near a full charge is reduced.

As a result, the necessary remaining capacity, which is the remaining capacity needed by the scheduled usage start timing of the electric moving body 10 or 10A, can be preserved in the battery, and therefore both convenience and deterioration suppression can be achieved.

The present invention is not limited to the embodiment described above, and it is obvious that various configurations can be adopted therein based on the content described in this Specification.

What is claimed is:

1. A charging control method for an electric moving body that moves using a battery as a power source, the charging control method comprising:
   acquiring scheduled usage of the electric moving body;
   acquiring a necessary remaining capacity that is a charging state necessary for the scheduled usage;
   when the necessary remaining capacity is not reached by a start timing of the scheduled usage, changing a charging plan set in advance prior to the acquired scheduled usage, the charging plan being changed in a manner that the necessary remaining capacity is reached by the start timing of the scheduled usage;
   acquiring a charging plan with a low-cost charging amount that is a maximum charging amount achieved by charging only in a time period during which an electricity cost is low, based on charging equipment information, a charging start timing, and a scheduled usage start timing of the electric moving body; and
   when a consumption amount of power caused by scheduled usage acquired when charging the battery is greater than that caused by scheduled usage acquired previously, and the necessary remaining capacity is not reached with a charging plan of one instance of charging with the low-cost charging amount that is the maximum charging amount achieved by charging only in the time period during which the electricity cost is low, changing the charging plan to a charging plan in which a user is allowed to select one of an effort reduction priority mode in which an increase in a number of charges is suppressed by performing charging also in a time period during which the electricity cost is not low and charging the battery up to the necessary remaining capacity that exceeds the low-cost charging amount that is the maximum charging amount achieved by charging only in the time period during which the electricity cost is low, or an electricity cost priority mode in which the battery is charged up to the necessary remaining capacity by charging a plurality of separate times only in the time period during which the electricity cost is low.

2. The charging control method for the electric moving body according to claim 1, wherein
   when the user is caused to select one of the effort reduction priority mode or the electricity cost priority mode, the user is caused to select one of the modes in advance via a terminal communicable with the electric moving body or, when there is power consumption that exceeds power consumption caused by typical usage, the terminal is provided with notification that the number of charges will increase in the electricity cost priority mode and the user is caused to select one of the modes with the notification as a trigger.

3. The charging control method for the electric moving body according to claim 1, wherein
a lower limit remaining capacity of the battery is configured to be set by a user.

4. The charging control method for the electric moving body according to claim 1, wherein
a lower limit remaining capacity of the battery is set to a default lower limit remaining capacity obtained by subtracting, from the necessary remaining capacity, the low-cost charging amount that is the maximum charging amount achieved by charging only in the time period during which the electricity cost is low.

5. The charging control method for the electric moving body according to claim 4, wherein
in a case where the lower limit remaining capacity of the battery is configured to be set by the user, and when a lower limit remaining capacity set by the user is greater than the default lower limit remaining capacity, the lower limit remaining capacity of the battery is changed from the default lower limit remaining capacity to the lower limit remaining capacity set by the user.

6. The charging control method for the electric moving body according to claim 3, wherein
if a current remaining capacity of the electric moving body is lower than the lower limit remaining capacity, the user is notified that the current remaining capacity is lower than the lower limit remaining capacity.

7. A charging control method for an electric moving body that moves using a battery as a power source, the charging control method comprising:
if there are a prescribed number of days on which charging and discharging are performed a plurality of times from when a scheduled usage of the electric moving body is acquired to a scheduled usage start timing,
causing a user to select whether a necessary remaining capacity that is necessary at the scheduled usage start timing is to be charged immediately before the scheduled usage start timing in an electricity cost priority mode in which the battery is charged by charging with a low-cost charging amount that is a maximum charging amount achieved by charging only in a time period during which an electricity cost is low, or in an effort reduction priority mode in which the battery is charged with a predetermined charging amount including a charging amount in a time period during which the electricity cost is not low; and
changing a charging plan existing before a charging process is performed immediately before the scheduled usage start timing, in a manner that a remaining capacity immediately before the scheduled usage start timing in the selected charging mode becomes a remaining capacity obtained by subtracting the low-cost charging amount from the necessary remaining capacity or a remaining capacity obtained by subtracting the predetermined charging amount from the necessary remaining capacity.

8. The charging control method for the electric moving body according to claim 7, further comprising
in a case where the user has selected the effort reduction priority mode, and when the necessary remaining capacity exceeds a deterioration suppression target remaining capacity,
suppressing a number of charges by allowing a charging plan in which the necessary remaining capacity exceeds the deterioration suppression target remaining capacity to be included in the charging plan existing before the charging process is performed immediately before the scheduled usage start timing.

9. The charging control method for the electric moving body according to claim 7, further comprising
in a case where the user has selected the effort reduction priority mode, and when the necessary remaining capacity exceeds a deterioration suppression target remaining capacity,
checking with the user about whether to allow a charging plan in which the necessary remaining capacity exceeds the deterioration suppression target remaining capacity to be included in the charging plan existing before the charging process is performed immediately before the scheduled usage start timing, and if not allowed by the user, notifying the user that charging is performed by increasing a number of charges.

10. An electric moving body that moves using a battery as a power source and comprises a charging control apparatus including a memory that stores instructions, and a CPU that reads and executes the instructions from the memory, wherein
the CPU executes the instructions to cause the charging control apparatus to:
acquire scheduled usage of the electric moving body;
acquire a necessary remaining capacity that is a charging state necessary for the scheduled usage;
when the necessary remaining capacity is not reached by a start timing of the scheduled usage, change a charging plan set in advance prior to the acquired scheduled usage, the charging plan being changed in a manner that the necessary remaining capacity is reached by the start timing of the scheduled usage;
acquiring a charging plan with a low-cost charging amount that is a maximum charging amount achieved by charging only in a time period during which an electricity cost is low, based on charging equipment information, a charging start timing, and a scheduled usage start timing of the electric moving body; and
when a consumption amount of power caused by scheduled usage acquired when charging the battery is greater than that caused by scheduled usage acquired previously, and the necessary remaining capacity is not reached with a charging plan of one instance of charging with the low-cost charging amount that is the maximum charging amount achieved by charging only in the time period during which the electricity cost is low, changing the charging plan to a charging plan in which a user is allowed to select one of an effort reduction priority mode in which an increase in a number of charges is suppressed by performing charging also in a time period during which the electricity cost is not low and charging the battery up to the necessary remaining capacity that exceeds the low-cost charging amount that is the maximum charging amount achieved by charging only in the time period during which the electricity cost is low, or an electricity cost priority mode in which the battery is charged up to the necessary remaining capacity by charging a plurality of separate times only in the time period during which the electricity cost is low.

\* \* \* \* \*